United States Patent
Wakai et al.

(10) Patent No.: US 10,664,998 B2
(45) Date of Patent: May 26, 2020

(54) CAMERA CALIBRATION METHOD, RECORDING MEDIUM, AND CAMERA CALIBRATION APPARATUS

(71) Applicant: Panasonic Intellectual Property Management Co., Ltd., Osaka (JP)

(72) Inventors: Nobuhiko Wakai, Osaka (JP); Takeo Azuma, Kyoto (JP); Kunio Nobori, Osaka (JP); Satoshi Sato, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 101 days.

(21) Appl. No.: 15/950,220

(22) Filed: Apr. 11, 2018

(65) Prior Publication Data

US 2018/0300901 A1 Oct. 18, 2018

(30) Foreign Application Priority Data

Apr. 18, 2017 (JP) ................. 2017-082272

(51) Int. Cl.
*G06T 7/80* (2017.01)
*G06T 7/73* (2017.01)

(52) U.S. Cl.
CPC .............. *G06T 7/85* (2017.01); *G06T 7/73* (2017.01); *G06T 2207/10012* (2013.01); *G06T 2207/30204* (2013.01)

(58) Field of Classification Search
CPC ... G06T 7/85; G06T 7/73; G06T 2207/30204; G06T 2207/10012; G06T 2207/30208
See application file for complete search history.

(56) References Cited

FOREIGN PATENT DOCUMENTS

| EP | 2 887 313 | 6/2015 |
|---|---|---|
| JP | 2012-202694 | 10/2012 |

OTHER PUBLICATIONS

Tani, Machine translation for JP 2012-202694, IDS (Year: 2012).*

(Continued)

*Primary Examiner* — Qian Yang
(74) *Attorney, Agent, or Firm* — Wenderoth, Lind & Ponack, L.L.P.

(57) ABSTRACT

A camera calibration method, which calculates camera parameters of two cameras using calibration points, includes: (a1) acquiring three-dimensional coordinate sets of the calibration points and image coordinate pairs of the calibration points in a camera image of each camera; (a2) acquiring multiple camera parameters of each camera; (a3) for each calibration point, calculating a view angle-corresponding length corresponding to a view angle of the two cameras viewing the calibration point; (a4) for each calibration point, calculating a three-dimensional position of a measurement point corresponding to a three-dimensional position of the calibration point using parallax of the calibration point between the two cameras; (a5) for each calibration point, weighting a difference between the three-dimensional coordinate set of the calibration point and the three-dimensional position of the measurement point corresponding to the calibration point using the view angle-corresponding length corresponding to the calibration point; and (a6) updating the camera parameters based on the weighted difference.

18 Claims, 13 Drawing Sheets

(56) References Cited

OTHER PUBLICATIONS

Extended European Search Report dated Jul. 3, 2018 in related European Patent Application No. 18166375.8.
Roger Y. Tsai, "A Versatile Camera Calibration Technique for High-Accuracy 3D Machine Vision Metrology Using Off-The-Shelf TV Cameras and Lenses", IEEE Journal of Robotics and Automation, vol. RA-3, No. 4, Aug. 4, 1987, pp. 323-344.
Zhengyou Zhang, "A Flexible New Technique for Camera Calibration", IEEE Transactions on Pattern Analysis and Machine Intelligence, vol. 22, No. 11, Nov. 11, 2000, pp. 1330-1334.

* cited by examiner

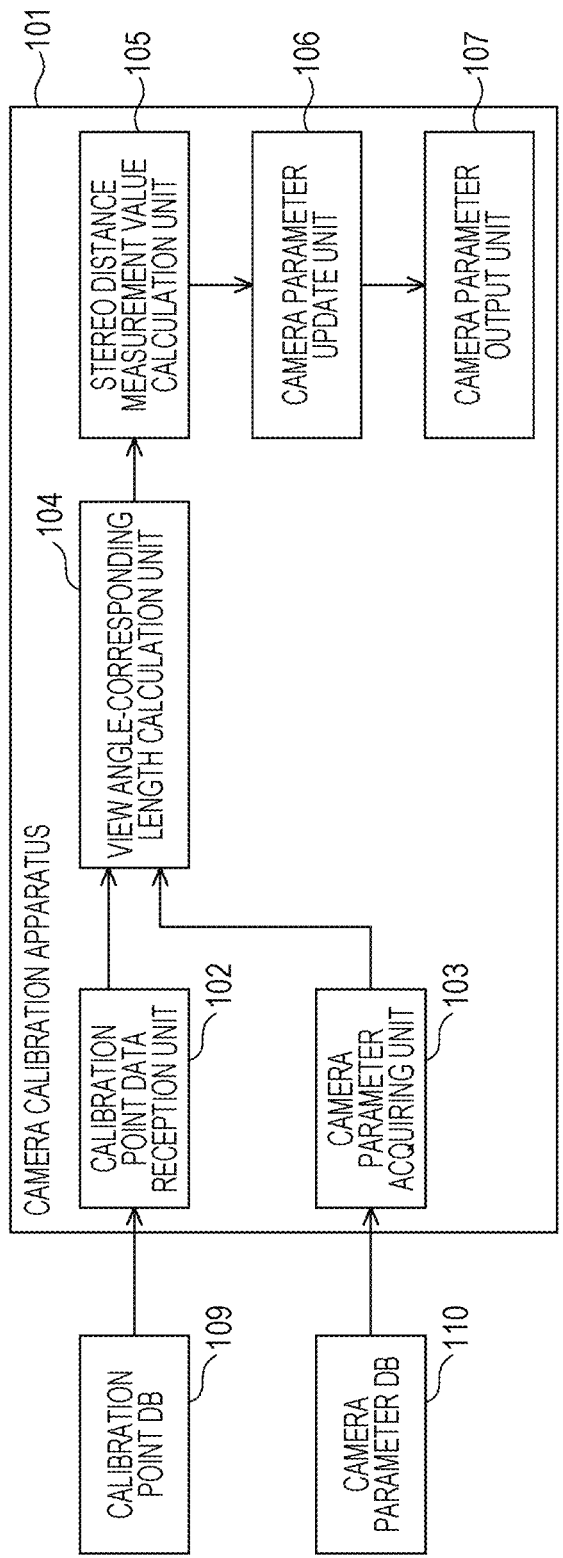

| POSITION OF CALIBRATION POINT | PIXEL POSITION OF CAMERA 21 | PIXEL POSITION OF CAMERA 22 |
|---|---|---|
| $(x1,y1,z1)$ | $(x211,y211)$ | $(x221,y221)$ |
| $(x2,y2,z2)$ | $(x212,y212)$ | $(x222,y222)$ |
| ... | ... | ... |
| $(xn,yn,zn)$ | $(x21n,y21n)$ | $(x22n,y22n)$ |

CAMERA CALIBRATION METHOD, RECORDING MEDIUM, AND CAMERA CALIBRATION APPARATUS

BACKGROUND

1. Technical Field

The present disclosure relates to a camera calibration method, a recording medium, and a camera calibration apparatus.

2. Description of the Related Art

Calculation of camera parameters, in other words calibration of a camera requires a function which evaluates the camera parameters based on a two-dimensional coordinate pair on a two-dimensional image or a three-dimensional coordinate set in a three-dimensional space. The two-dimensional coordinate pair on the two-dimensional image is also referred to as an image coordinate pair, and the three-dimensional coordinate set in the three-dimensional space is also referred to as a world coordinate set. The evaluation function described above expresses the difference between the calculated camera parameters and the correct camera parameters, and if the calculated camera parameters coincide with the correct camera parameters, the evaluation function is 0. Camera calibration employing a conventional evaluation function may include: first preparing a pair of a world coordinate set $A_{1i}$ of a target point $A_{0i}$ in a three-dimensional space and an image coordinate pair $A_{2i}$ of a point corresponding to the target point $A_{0i}$ by use of a calibration apparatus; then obtaining an image coordinate pair $A_{3i}$ of a point which is a projection of the world coordinate set $A_{1i}$ of the target point $A_{0i}$ onto an image based on the camera parameters; and using as an evaluation value a total sum $\Sigma A_{4i}$ (also referred to as a reprojection error) of distances $A_{4i}$ between the image coordinate pair $A_{2i}$ and the image coordinate pair $A_{3i}$. Another case may include using as an evaluation value the difference between the length measured for the target point with a stereo camera and the length measured in advance from the stereo camera to the target point. For example, the former technique, which uses the pair of a world coordinate set and an image coordinate pair, is disclosed in Roger Y. Tsai, "A Versatile Camera Calibration Technique for High-Accuracy 3D Machine Vision Metrology Using Off-the-Shelf TV Cameras and Lenses", Journal of Robotics and Automation, IEEE, August 1987, Vol. RA-3, No. 4, pp. 323-344 (Non-Patent Document 1) and Zhengyou Zhang, "A Flexible New Technique for Camera Calibration", IEEE Transactions on Pattern Analysis and Machine Intelligence, IEEE, 2000, Vol. 22 (11), pp. 1330-1334 (Non-Patent Document 2). The latter technique, which uses a stereo camera, is disclosed in Japanese Unexamined Patent Application Publication No. 2012-202694 (Patent Document 1).

SUMMARY

Conventional camera calibration uses a function which evaluates camera parameters based on a distance between points on an image or stereo distance measurement of a narrow angle camera. On the other hand, there is a case where accurate calibration is impossible in an entire field of view of the camera in the calibration of a wide angle camera for stereo distance measurement.

One non-limiting and exemplary embodiment provides a camera calibration method, a recording medium, and a camera calibration apparatus which enable accurate calibration across a large area in the field of view of a camera.

In one general aspect, the techniques disclosed here feature a camera calibration method which calculates camera parameters of two cameras by use of calibration points, including: (a1) acquiring calibration point data which is stored in a first memory and which includes three-dimensional coordinate sets of the calibration points and image coordinate pairs of the calibration points in a camera image of each of the cameras; (a2) acquiring camera parameters of each camera which are stored in a second memory; (a3) for each calibration point, calculating a view angle-corresponding length which corresponds to a size of an angle of view of the two cameras viewing the calibration point based on the calibration point data and the camera parameters; (a4) for each calibration point, calculating a three-dimensional position of a measurement point which corresponds to a three-dimensional position of the calibration point by use of parallax of the calibration point between the two cameras based on the image coordinate pair of the calibration point and the camera parameters; (a5) for each calibration point, weighting a difference between the three-dimensional coordinate set of the calibration point and the three-dimensional position of the measurement point corresponding to the calibration point by use of the view angle-corresponding length calculated using the calibration point; (a6) updating the camera parameters based on the weighted difference; and (a7) outputting the updated camera parameters; at least one of the process (a1) to the process (a7) being executed by a processor.

It should be noted that the comprehensive or specific embodiments may be implemented as a system, a device, a method, an integrated circuit, a computer program, or a recording medium such as a computer-readable recording disc, or any selective combination thereof. The computer-readable recording medium includes a non-volatile recording medium such as a compact disc-read only memory (CD-ROM).

The camera calibration technique according to the present disclosure enables accurate calibration across a large area in the field of view of a camera. Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6A is a block diagram illustrating an example of a configuration of the camera calibration apparatus according to Embodiment 1;

DETAILED DESCRIPTION

[Underlying Knowledge Forming Basis of the Present Disclosure]

Regarding the camera calibration techniques described in "BACKGROUND", the present inventors have found that the following problems arise in the case of applying these techniques to stereo distance measurement of a wide angle camera.

First, in an image outer peripheral portion corresponding to an edge of the field of view of a camera, the calibration error greatly affects the accuracy of the stereo distance measurement and it is impossible to minimize the distance measurement error in a wide range of field of view including the image outer peripheral portion.

Figure 1:
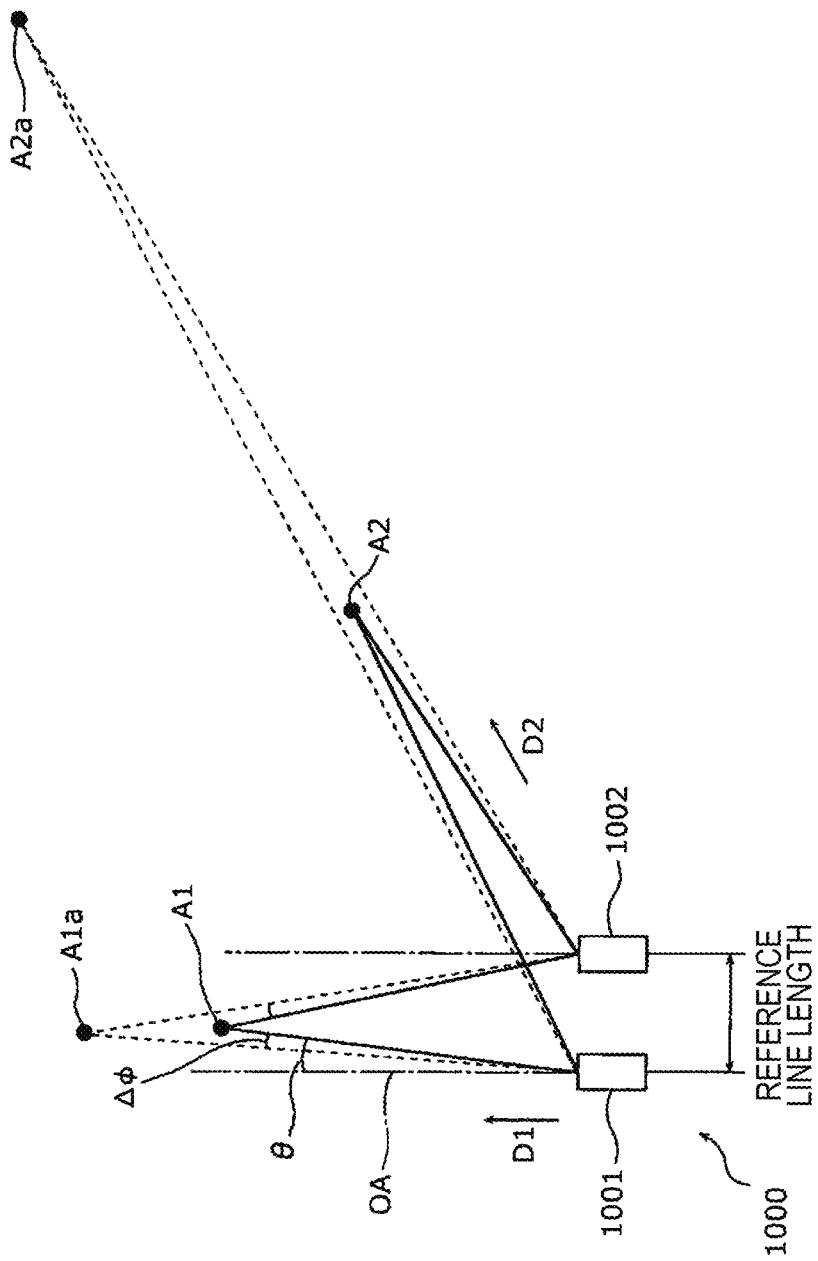
FIG. 1 is a diagram exemplifying a distance measurement error which can occur in a case of stereo distance measurement by use of two wide angle cameras provided in a multiple-lens wide angle camera.

For example, reference to FIG. 1 shows an example of a distance measurement error which can occur in the case of stereo distance measurement by use of two wide angle cameras 1001 and 1002 provided in a multiple-lens wide angle camera 1000. The multiple-lens wide angle camera 1000 includes multiple wide angle cameras. Each of the multiple wide angle cameras includes a wide angle lens. The multiple-lens wide angle camera 1000 has a wide field of view ranging from a front direction D1, which is a direction toward front of the wide angle camera 1001 and toward front of the camera 1002, to a direction D2, which forms a large angle with the front direction D1. The front direction D1 is a direction along an optical axis OA of the wide angle cameras 1001 and 1002 and is a direction which extends from the multiple-lens wide angle camera 1000 toward near the center of the angle of field of view. The direction D2 is a direction which extends from the multiple-lens wide angle camera 1000 and near the edge of the angle of field of view. For example, the multiple wide angle cameras of the multiple-lens wide angle camera 1000 are positioned such that the optical axes thereof are parallel to each other. A subject near the center of the angle of field of view of the wide angle cameras 1001 and 1002 is positioned near the center of the captured image, and a subject near the edge of the angle of field of view is positioned near the edge of the captured image, in other words at the image outer peripheral portion.

If a distance $B_{11}$ from the wide angle camera 1001 to the subject is obtained and a distance $B_{12}$ from the wide angle camera 1002 to the subject is obtained by using the wide angle cameras 1001 and 1002 with a calibration error to carry out stereo distance measurement on the subject, the actual distance $B_{13}$ from the wide angle camera 1001 to the subject is different from the distance $B_{11}$, and the actual distance $B_{14}$ from the wide angle camera 1002 to the subject is different from the distance $B_{12}$. Consider the case where the two cameras both capture a point $B_{00}$ in a three-dimensional space. The stereo distance measurement is a technique of calculating the three-dimensional position of the point $B_{00}$ from the difference in the position of the point corresponding to the point $B_{00}$ on each of the captured images, in other words the parallax. The stereo distance measurement is based on the principle of triangulation.

For example, if the wide angle cameras 1001 and 1002 capture the subject, the incident angle of the image of the subject into each of the lenses of the wide angle cameras 1001 and 1002 has an angular error $\Delta\varphi$ relative to the design incident angle $\theta$ due to the influence of the calibration errors. Note that the angular errors $\Delta\varphi$ of the wide angle cameras 1001 and 1002 can be the same or different. For example, when the wide angle cameras 1001 and 1002 capture a subject at a position A1 in the front direction D1, the distance from the wide angle camera 1001 to a position A1a is outputted as a stereo distance measurement result from the wide angle camera 1001 to the position A1, and the distance from the wide angle camera 1002 to the position A1a is outputted as a stereo distance measurement result from the wide angle camera 1002 to the position A1. In addition, when the wide angle cameras 1001 and 1002 capture a subject at a position A2 in the front direction D2, the distance from the wide angle camera 1001 to a position A2a is outputted as a stereo distance measurement result from the wide angle camera 1001 to the position A2, and the distance from the wide angle camera 1002 to the position A2a is outputted as a stereo distance measurement result from the wide angle camera 1002 to the position A2. The distance between the positions A2 and A2a is far larger than the distance between the positions A1 and A1a. As described above, regarding the angle of field of view of the multiple-lens wide angle camera 1000 in a direction along a plane parallel to the sheet which is a plane where the wide angle cameras 1001 and 1002 are placed in parallel, calibration accuracy more greatly affects the stereo distance measurement result near the edge of the angle of field of view than near the center of the angle of field of view.

Second, distance measurement accuracy is not directly minimized as an evaluation value. To explain the details, in order to carry out camera calibration, for example, it is necessary to associate the point under consideration in a three-dimensional space with the pixel position of the point corresponding to the point under consideration in the camera image produced by capturing the point under consideration. The three-dimensional coordinate set in the three-dimensional space is also referred to as a world coordinate set. The position of the camera is expressed using the world coordinate set. The camera image, which is a two-dimensional image, means an image captured with a camera, and the two-dimensional coordinate pair defined on the camera image is also referred to as an image coordinate pair. It is necessary to associate the three-dimensional coordinate set of the point under consideration in the three-dimensional space where the camera is present with the pixel position (hereinafter referred to as a corresponding point) in the two-dimensional image obtained by capturing the three-dimensional space with the camera. The corresponding point is a point onto which the point under consideration is projected.

Conventional techniques first capture a calibration index with a camera. The calibration index is, for example, a checker pattern. The checker pattern has a pattern shape, and the three-dimensional coordinate set of each of the characteristic points, for example each of the intersections of the checker pattern, are known. Next, the conventional techniques detect the point in the captured camera image corresponding to an intersection of the checker pattern, and obtain the pixel position in the captured camera image onto which a characteristic point is projected. The above procedures associate the three-dimensional coordinate set of a characteristic point with the pixel position of the point, in the two-dimensional image, onto which the characteristic point is projected.

Figure 2:
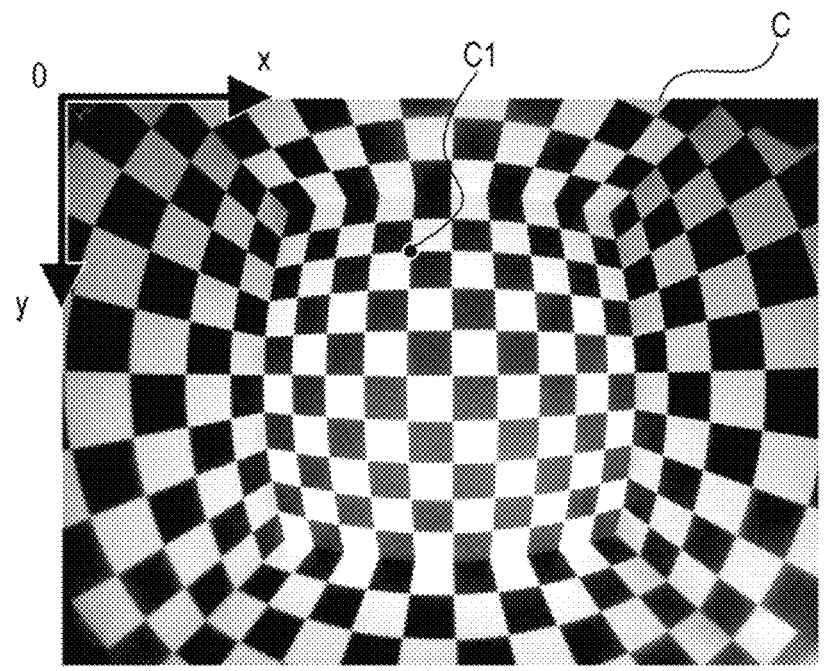
FIG. 2 is a diagram illustrating an example of an image of a checker pattern captured by a fisheye camera.

For example, reference to FIG. 2 shows an example of a camera image of a calibration index produced by capturing as a calibration index a checker pattern drawn at definite intervals on the inner side of a box-shaped subject. For example, as illustrated in FIG. 2, an xy-coordinate system having "0" positioned in the upper left of a camera image C in FIG. 2 as the origin is set as an image coordinate system of the camera image C. For such a camera image C, an operator operates a processing device such as a computer, reads, for example, a position C1 of an intersection of the checker pattern according to the image coordinate system, and obtains the image coordinate pair of the intersection position C1 and the like. Moreover, the operator causes the processing device to refer to a rule which associates in advance the intersection position C1 of the checker pattern with the three-dimensional coordinate set thereof and to obtain the three-dimensional coordinate set of the position corresponding to the intersection position C1 in the camera image. To be more specific, it is possible to identify the three-dimensional coordinate set by providing the origin and the three axes of the X-, Y-, and Z-axes of the world coordinate system at a particular position in the three-dimensional space and then checking the checker pattern intersection number of the intersection C1 under consideration counted from the origin.

Furthermore, a coordinate transformation based on the camera parameters makes it possible to project a point in the world coordinate system into a point in the image coordinate system. In other words, use of the camera parameters makes it possible to obtain a calculated corresponding point on the camera image which corresponds to a point in the world coordinate system.

What is more, it is possible to calculate camera parameters from a pair of the world coordinate set (X, Y, Z) and the image coordinate pair (x, y) at an actually corresponding position obtained by capturing the calibration index. Taking a model employing a pinhole camera as an example, Equation 1 shows a projection equation from the world coordinate set into the image coordinate pair using the camera parameters.

$$h\begin{bmatrix} x \\ y \\ 1 \end{bmatrix} = \begin{bmatrix} 1/d'x & 0 & C_x \\ 0 & 1/d'y & C_y \\ 0 & 0 & 1 \end{bmatrix} \begin{bmatrix} f & 0 & 0 & 0 \\ 0 & f & 0 & 0 \\ 0 & 0 & 1 & 0 \end{bmatrix} \quad \text{(Equation 1)}$$

$$\begin{bmatrix} R_{11} & R_{12} & R_{13} & T_X \\ R_{21} & R_{22} & R_{23} & T_Y \\ R_{31} & R_{32} & R_{33} & T_Z \\ 0 & 0 & 0 & 1 \end{bmatrix} \begin{bmatrix} X \\ Y \\ Z \\ 1 \end{bmatrix}$$

The camera parameters of this pinhole camera model include, as components: an x-coordinate component $C_x$ and a y-coordinate component $C_y$ of the center of the camera image; a focal length f; an x-axis direction length d'x and a y-axis direction length d'y of one pixel of the image sensor of the camera; components $R_{ij}$ of a 3-by-3 rotation matrix R representing a rotation of the camera about a reference in the world coordinate system; an X-coordinate component $T_X$, a Y-coordinate component $T_Y$, and a Z-coordinate component $T_Z$ of a translation vector T representing a translational distance of the camera with respect to a reference in the world coordinate system; and a parameter h without a degree of freedom. Regarding the elements $R_{ij}$ of the rotation matrix R, The subscript i denotes the row number of the rotation matrix R and the subscript j denotes the column number of the rotation matrix R. For example, the internal parameters of the camera Cx, Cy, f, d'x, and d'y each have a design value and can be specified as the design values. The rotation matrix R and translation vector T, which are external parameters of the camera, are each a parameter concerning the orientation and the position of the camera, and cannot be specified as the design values in some cases even if they each have a design value. For this reason, design values may be used for the internal parameters of the camera and only the external parameters of the camera may be calculated.

In addition, as illustrated in FIG. 2, warpage such as distortion produced in the checker pattern of a camera image when capturing the checker pattern in the three-dimensional space can be expressed by using $\Phi([x\ y]^T)$ as in Equation 2 below, which represents a transformation from the image coordinate pair (x, y) without warpage into the image coordinate pair (xd, yd) with warpage.

$$\begin{bmatrix} x_d \\ y_d \end{bmatrix} = \Phi\left(\begin{bmatrix} x \\ y \end{bmatrix}\right) \quad \text{(Equation 2)}$$

Regarding the camera calibration technique in the conventional technique, a description is hereinafter provided sequentially for the techniques described in the patent document and the non-patent documents and their problems.

In the technique of Patent Document 1, the evaluation function of the camera parameters uses the three-dimensional distance (also referred to as a Euclidean distance) between characteristic points calculated by stereo distance measurement and the distance between the premeasured characteristic points described above. The stereo distance measurement is a distance measurement method based on the principle of triangulation. For this reason, the shorter the reference line length being the distance between the stereo camera, specifically the distance between the two lenses, the smaller the angle of view formed by the lines of sight from the two lenses to the subject. Thus, the distance measurement accuracy is reduced. For example, as illustrated in FIG.

1, in the case of stereo distance measurement of the subject to be captured at the image outer peripheral portion near the edge of the angle of field of view of the wide angle camera (for example the subject at the position A2), the distance measurement accuracy is reduced compared to the case of stereo distance measurement of the subject to be captured near the center of the angle of field of view of the wide angle camera (for example the subject at the position A1).

The angle formed by the line segment connecting the position A2 and the center of the lens of the camera 1001 and the line segment connecting the position A2 and the center of the lens of the camera 1002 is smaller than the angle formed by the line segment connecting the position A1 and the center of the lens of the camera 1001 and the line segment connecting the position A1 and the center of the lens of the camera 1002. In this case, the situation is substantially the same as the situation where the reference line length between the lens of the camera 1001 and the lens of the camera 1002 viewed from the position A2 is shorter than the reference line length between the lens of the camera 1001 and the lens of the camera 1002 viewed from the position A1. As described above, it cannot be said that the evaluation function of the technique described in Patent Document 1 is optimized for wide angle stereo cameras.

One may define as follows the apparent inter-lens distance between the lens CA2 included in the camera CA1 viewed from the subject and the lens CB2 included in the camera CB1 viewed from the subject. The "apparent inter-lens distance between the lens CA2 included in the camera CA1 and the lens CB2 included in the camera CB1" is the length of the chord of a circular sector which has a central angle being an angle of view formed by the line segment CA4 between the point representing the subject and the center (specifically, the center of projection) CA3 of the lens CA2 (specifically, the line of sight CA5) and the line segment CB4 between the point representing the subject and the center (specifically, the center of projection) CB3 of the lens CB2 (specifically, the line of sight CB5), and which has an arc passing through the center CA3 and/or the center CB3. Here, determination may be made such that the arc includes one of the center CA3 and the center CB3 nearer the subject.

In the present specification, the view angle-corresponding length is defined as the length which corresponds to the angle of view and correlates to the size of the angle of view, and the apparent inter-lens distance is an example of the view angle-corresponding length.

Note that the angle of view being an angle formed by the line segment CA4 between the point under consideration and the center CA3 of the lens CA2 included in the camera CA1 (specifically, line of sight CA5) and the line segment CB4 between the point under consideration and the center CB3 of the lens CB2 included in the camera CB1 (specifically, line of sight CB5) may be referred to as an angle of view when the point under consideration is viewed from the camera CA1 and the camera CB1, an angle of view of the camera CA1 and the camera CB1 when viewed from the point under consideration, or an angle of view of the camera CA1 and the camera CB1 with respect to the point under consideration.

Although the details are described later, the value of the view angle-corresponding length corresponds one-to-one to the value of the angle of view, to be more specific, can be uniquely determined by the value of the angle of view. Moreover, the view angle-corresponding length becomes larger when the angle of view becomes larger, and becomes smaller when the angle of view becomes smaller. For this reason, the view angle-corresponding length has the same behavior as the angle of view and correlates to the angle of view. For example, denote by LA the distance between the center of the lens of one camera and the subject. An example of the view angle-corresponding length can satisfy the relationship view angle-corresponding length=2 LA sin (angle of view/2). Note that 0≤(angle of view/2)≤π/2 [rad]. Note also that in the following description, the distance between the two cameras is referred to as the reference line length in some cases. This reference line length represents the actual distance between the centers of the lenses of the two cameras.

In the technique of Non-Patent Document 1, the evaluation function of the camera parameters only uses the reprojection error based on the two-dimensional image coordinate pair. Hence, errors in, for example, distance measurement in the three-dimensional space are not directly reflected on the evaluation function. For this reason, it cannot be said that the evaluation function of Non-Patent Document 1 is optimized for applications targeted for the three-dimensional space such as stereo distance measurement.

In the technique of Non-Patent Document 2, the calibration index is captured with one camera while being moved such that it has different depths. A point $A_{12i}$ and a point $A_{22i}$ on a plane image $A_{11i}$ and a plane image $A_{21i}$, respectively, which are obtained by the above procedure, are associated with a reference point $A_{32i}$ in the world coordinate system. Furthermore, regarding a group ($A_{33i}$, $A_{13i}$, $A_{23i}$) of the world coordinate set $A_{33i}$ of the reference point $A_{32i}$ in the world coordinate system, the image coordinate pair $A_{13i}$ of the point $A_{12i}$ on the plane image $A_{11i}$ corresponding to the reference point $A_{32i}$, and the image coordinate pair $A_{23i}$ of the point $A_{22i}$ on the plane image $A_{21i}$ corresponding to the reference point $A_{32i}$, one uses the camera parameters to obtain the image coordinate pair of the projection point which is a projection of the reference point $A_{32i}$ of the world coordinate system onto the image coordinate system, specifically the image coordinate pair $A_{14i}$ of the projection point in the plane image $A_{11i}$ and the image coordinate pair $A_{24i}$ of the projection point in the plane image $A_{21i}$. Then, one calculates the distance sum of squares between the image coordinate pair of the point corresponding to the reference point and the image coordinate pair of the projection point $|A_{13i}-A_{14i}|^2+|A_{23i}-A_{24i}|^2$. Thereafter, one calculates the total sum of the distance sums of squares concerning all reference points $\Sigma\{|A_{13i}-A_{14i}|^2+|A_{23i}-A_{24i}|^2\}$, and the camera is calibrated so that the total sum is minimized. Thus, in Non-Patent Document 2, the evaluation function uses the total distance sum of squares described above. It cannot be said that such an evaluation function is optimized for applications targeted for the three-dimensional space such as stereo distance measurement because the evaluation function does not take into consideration errors in, for example, distance measurement in the three-dimensional space.

In recent years, use of a stereo camera has been under consideration and discussion for, for example, periphery monitoring and driver assistance in moving objects such as land vehicles and aerial drones. In the case of these purposes, a wide angle camera is preferable as the stereo camera. In the calibration of a stereo camera which is disposed for measurement of the distance from the moving object and which has a wide angle field of view, it is necessary to put emphasis on distance measurement accuracy and to make small the calibration error including the image outer peripheral portion. In light of the above problem, the present inventors have created the following technique in order to calibrate multiple-lens cameras such as stereo cameras so that the cameras have high accuracy across a large area in the field of view.

In one general aspect, the techniques disclosed here feature a camera calibration method which calculates camera parameters of two cameras by use of calibration points, including: (a1) acquiring calibration point data which is stored in a first memory and which includes three-dimensional coordinate sets of the calibration points and image coordinate pairs of the calibration points in a camera image of each of the cameras; (a2) acquiring camera parameters of each camera which are stored in a second memory; (a3) for each calibration point, calculating a view angle-corresponding length which corresponds to a size of an angle of view of the two cameras viewing the calibration point based on the calibration point data and the camera parameters; (a4) for each calibration point, calculating a three-dimensional position of a measurement point which corresponds to a three-dimensional position of the calibration point by use of parallax of the calibration point between the two cameras based on the image coordinate pair of the calibration point and the camera parameters; (a5) for each calibration point, weighting a difference between the three-dimensional coordinate set of the calibration point and the three-dimensional position of the measurement point corresponding to the calibration point by use of the view angle-corresponding length calculated using the calibration point; (a6) updating the camera parameters based on the weighted difference; and (a7) outputting the updated camera parameters; at least one of the process (a1) to the process (a7) being executed by a processor. Note that the first memory and the second memory may be different memories or may together form a single memory.

In the aspect described above, the three-dimensional position of the measurement point corresponds to the three-dimensional position of the calibration point obtained by two cameras carrying out stereo distance measurement on the calibration point. The three-dimensional position of the measurement point is greatly affected by the error in the camera parameters in the case where the calibration point is located near the peripheral edge rather than near the center of the field of view of the camera. This is because the angle of view formed by the two lines of sight from the two cameras to the calibration point is smaller near the edge than near the center of the field of view of the camera. In addition, the view angle-corresponding length becomes shorter as the position of the calibration point moves from the center toward the edge of the field of view of the camera. To be more specific, even if the errors in the camera parameters are the same, the errors in the three-dimensional position of the measurement point relative to the calibration point become larger as the view angle-corresponding length becomes shorter. It is possible to reduce the variation in the sizes of differences attributed to the position of the calibration point such as near the center or near the edge of the field of view of a camera by weighting the difference in position between the calibration point and its measurement point using the above-described view angle-corresponding length. Moreover, the differences are weighted as described above for multiple calibration points. Regarding the camera parameters of the cameras updated based on the weighted differences, the accuracy can be made high relative to the target values, for example, the design values. Thus, it is possible to accurately calibrate the camera regardless of the position of the calibration point in the field of view of the camera. Hence, it is possible to accurately calibrate the camera while suppressing the influence of the position of the calibration point across a large area in the field of view of the camera.

Preferably, in the camera calibration method according to the aspect described above, when weighting the difference, the process (a5) normalizes the view angle-corresponding length calculated using the calibration point to be used by a total sum of the view angle-corresponding lengths calculated using the respective calibration points. According to the aspect described above, the normalized view angle-corresponding length takes values between 0 and 1. Thus, the normalized view angle-corresponding lengths function as weights independent of the total sum of the view angle-corresponding lengths.

Preferably, in the camera calibration method according to the aspect described above, the process (a5) uses only the difference related to the calibration point used to calculate the view angle-corresponding length larger than a threshold. According to the aspect described above, the measurement point corresponding to a calibration point having a view angle-corresponding length equal to or less than the threshold is excluded. For example, if the view angle-corresponding length is extremely short, the difference in position between a measurement point and the calibration point can diverge to infinity. As described above, by excluding a measurement point which makes the difference too large, it is possible to prevent biased calibration of a camera dependent on such a difference.

Preferably, in the camera calibration method according to the aspect described above, when weighting the difference, the process (a5) divides the view angle-corresponding length calculated using the calibration point to be used by a distance between the calibration point and the cameras. According to the aspect described above, even if the view angle-corresponding length of two cameras for a calibration point is fixed, the angle of view from the two cameras to the calibration point becomes smaller as the distance between the cameras and the calibration point becomes larger. For this reason, the difference in position between the calibration point and the measurement point becomes larger. Thus, the weighting of a measurement point makes it possible to reduce the influence attributed to the view angle-corresponding length and the influence attributed to the distance between the cameras and the calibration point.

Preferably, in the camera calibration method according to the aspect described above, when weighting the difference, the process (a5) divides the view angle-corresponding length calculated using the calibration point to be used by a square of a distance between the calibration point and the cameras. According to the aspect described above, when weighting a measurement point, it is possible to effectively reduce the influence attributed to the view angle-corresponding length and the influence of the large distance between the cameras and the calibration point.

Preferably, in the camera calibration method according to the aspect described above, the process (a6) calculates an evaluation value using a total sum of the differences for the respective calibration points and updates the camera parameters such that the evaluation value is small. According to the aspect described above, use of the evaluation value makes it possible to effectively calculate camera parameters having high calibration accuracy.

In one general aspect, the techniques disclosed here feature a recording medium which is non-volatile and computer-readable and which includes a control program to cause a device provided with a processor to execute processing, the processing being executed by a computer and including:

(a1) acquiring calibration point data including three-dimensional coordinate sets and image coordinate pairs of calibration points from a first memory, the image coordinate pairs of the calibration points being image coordinate pairs of the calibration points in a camera image of each of two cameras; (a2) acquiring camera parameters of each camera from a second memory; (a3) for each calibration point, calculating a view angle-corresponding length which corresponds to a size of an angle of view of the two cameras viewing the calibration point based on the calibration point data and the camera parameters; (a4) for each calibration point, calculating a three-dimensional position of a measurement point which corresponds to a three-dimensional position of the calibration point by use of parallax of the calibration point between the two cameras based on the image coordinate pair of the calibration point and the camera parameters; (a5) for each calibration point, weighting a difference between the three-dimensional coordinate set of the calibration point and the three-dimensional position of the measurement point corresponding to the calibration point by use of the view angle-corresponding length calculated using the calibration point; (a6) updating the camera parameters based on the weighted difference; and (a7) outputting the updated camera parameters. Note that the first memory and the second memory may be different memories or may together form a single memory. The aspect described above makes it possible to obtain the same effects as those of the camera calibration method according to an aspect of the present disclosure.

Preferably, in the camera calibration method according to the aspect described above, when weighting the difference, the process (a5) normalizes the view angle-corresponding length calculated using the calibration point to be used by a total sum of the view angle-corresponding lengths calculated using the respective calibration points.

Preferably, in the camera calibration method according to the aspect described above, the process (a5) uses only the difference related to the calibration point used to calculate the view angle-corresponding length larger than a threshold.

Preferably, in the camera calibration method according to the aspect described above, when weighting the difference, the process (a5) divides the view angle-corresponding length calculated using the calibration point to be used by a distance between the calibration point and the cameras.

Preferably, in the camera calibration method according to the aspect described above, when weighting the difference, the process (a5) divides the view angle-corresponding length calculated using the calibration point to be used by a square of a distance between the calibration point and the cameras.

Preferably, in the camera calibration method according to the aspect described above, the process (a6) calculates an evaluation value using a total sum of the differences for the respective calibration points and updates the camera parameters such that the evaluation value is small.

In one general aspect, the techniques disclosed here feature a camera calibration apparatus which includes a processing circuit to calculate camera parameters of two cameras, the processing circuit performing processing including: (a1) acquiring calibration point data which includes three-dimensional coordinate sets of calibration points and image coordinate pairs of the calibration points in a camera image of each of the two cameras from a first memory; (a2) acquiring camera parameters of each camera from a second memory; (a3) for each calibration point, calculating a view angle-corresponding length which corresponds to a size of an angle of view of the two cameras viewing the calibration point based on the calibration point data and the camera parameters; (a4) for each calibration point, calculating a three-dimensional position of a measurement point which corresponds to a three-dimensional position of the calibration point by use of parallax of the calibration point between the two cameras based on the image coordinate pair of the calibration point and the camera parameters; (a5) for each calibration point, weighting a difference between the three-dimensional coordinate set of the calibration point and the three-dimensional position of the measurement point corresponding to the calibration point by use of the view angle-corresponding length calculated using the calibration point; (a6) updating the camera parameters based on the weighted difference; and (a7) outputting the updated camera parameters. Note that the first memory and the second memory may be different memories or may together form a single memory. The aspect described above makes it possible to obtain the same effects as those of the camera calibration method according to an aspect of the present disclosure.

Preferably, in the camera calibration method according to the aspect described above, when weighting the difference, the processing circuit normalizes the view angle-corresponding length calculated using the calibration point to be used by a total sum of the view angle-corresponding lengths calculated using the respective calibration points.

Preferably, in the camera calibration method according to the aspect described above, the processing circuit uses only the difference related to the calibration point used to calculate the view angle-corresponding length larger than a threshold.

Preferably, in the camera calibration method according to the aspect described above, when weighting the difference, the processing circuit divides the view angle-corresponding length calculated using the calibration point to be used by a distance between the calibration point and the cameras.

Preferably, in the camera calibration method according to the aspect described above, when weighting the difference, the processing circuit divides the view angle-corresponding length calculated using the calibration point to be used by a square of a distance between the calibration point and the cameras.

Preferably, in the camera calibration method according to the aspect described above, the processing circuit calculates an evaluation value using a total sum of the differences for the respective calibration points and updates the camera parameters such that the evaluation value is small.

Note that the general or specific aspects described above may have the form of a system, a device, a method, an integrated circuit, a computer program, or a recording medium such as a computer-readable recording disc, and may be a combination of any of the system, the device, the method, an integrated circuit, the computer program, and the recording medium. The computer-readable recording medium includes a non-volatile recording medium such as a CD-ROM.

Hereinafter, a camera calibration apparatus and the like according to the embodiments are described with reference to the drawings. Note that the embodiments to be described later indicate comprehensive or specific examples. The values, shapes, materials, constituents, the manner of positioning and connecting the constituents, steps, the order of steps, and the like shown in the embodiments to be described later are an example and do not limit the present disclosure. Note that among the constituents in the embodiments to be described later, constituents not described in independent claims representing an uppermost concept are explained as optional constituents. Note that in the description of the embodiments to be described later, phrases with "substantially" such as substantially parallel and substantially perpendicular may be used. For example, the meanings of substantially parallel include not only perfectly parallel but also almost parallel. To be more specific, the phrase also means an error of about a few percent. The same is applied to other phrases with "substantially".

Embodiment 1

[1-1-1. Configuration of Camera System]

Figure 3:
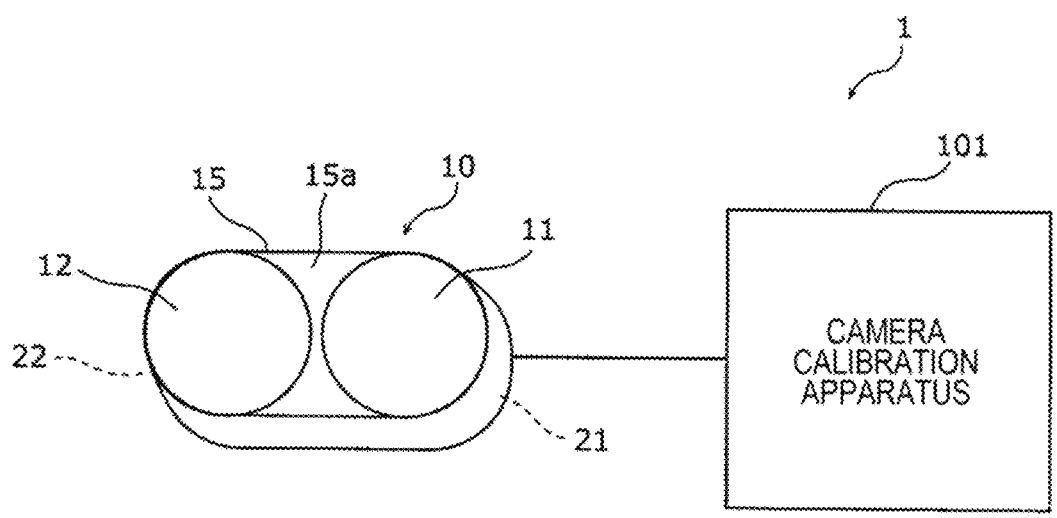
FIG. 3 is a block diagram illustrating an example of a configuration of a camera system provided with a camera calibration apparatus according to Embodiment 1.

Reference to FIG. 3 shows a configuration of a camera system 1 including a camera calibration apparatus 101 according to Embodiment 1. The camera system 1 includes a multiple-lens camera 10 which has two or more lenses and a camera calibration apparatus 101 which calibrates camera parameters of the multiple-lens camera 10. The multiple-lens camera 10 includes multiple lenses 11 and 12 in one housing 15. Note that the multiple-lens camera 10 may include separate multiple cameras each of which includes a lens. Note that although no limitation is intended, the multiple-lens camera 10 in the embodiment is a stereo camera and is capable of stereo distance measurement of the position of a subject. Such a camera system 1 may be mounted on a moving object, for example, a vehicle, a marine vessel, and flying body. The vehicle may be, for example, an automobile, a truck, a bus, a two-wheeler, a transportation vehicle, a railed vehicle, a construction machine, or material-handling equipment. The flying body may be, for example, an aircraft or a drone.

[1-1-2. Configuration of Multiple-Lens Camera]

Reference to FIG. 3 shows that the multiple-lens camera 10 includes two or more lenses, and although no limitation is intended, the embodiment includes two lenses 11 and 12. To be more specific, the multiple-lens camera 10 includes a housing 15 in the shape of a rectangular parallelepiped and the two lenses 11 and 12 exposed to the outside through one wall portion 15a of the housing 15. Each of the lenses 11 and 12 may be a lens group formed by multiple lenses. The two lenses 11 and 12 are positioned such that the optical axes thereof are parallel to each other. Each of the optical axes is substantially perpendicular to the wall portion 15a. Note that the optical axes of the lenses 11 and 12 do not have to be parallel to one another.

Moreover, each of the lenses 11 and 12 is a wide angle lens. An example of the wide angle lens is a lens having an angle of field of view of 60° or more. Although no limitation is intended, the angles of field of view of the lenses 11 and 12 are the same in the embodiment. Each of the lenses 11 and 12 may have an angle of field of view of 180° or more such as a fisheye lens. The optical axis of each of the lenses 11 and 12 passes through substantially the center of its angle of field of view.

The multiple-lens camera 10 further includes two image sensors (not illustrated) respectively provided to the lenses 11 and 12. Each of the lenses 11 and 12 and the corresponding image sensor form a wide angle camera. Each of the wide angle cameras has a wide angle of field of view with the optical axis of the corresponding one of the lenses 11 and 12 as the center.

Such a multiple-lens camera 10 includes two wide angle cameras and is a multiple-lens camera which has a wide angle of field of view. The wide angle camera including the lens 11 and the image sensor corresponding to the lens 11 is referred to as a camera 21, the wide angle camera including the lens 12 and the image sensor corresponding to the lens 12 is referred to as a camera 22. The cameras 21 to 24 are used as a camera collectively included in the multiple-lens camera or used as separate cameras.

In addition, each of the image sensors may be one which receives a light ray passing through the corresponding lens the lenses 11 and 12 and forms an image using the received light ray. Examples include a complementary metal-oxide semiconductor (CMOS) image sensor and a charge coupled device (CCD) image sensor.

Figure 4:
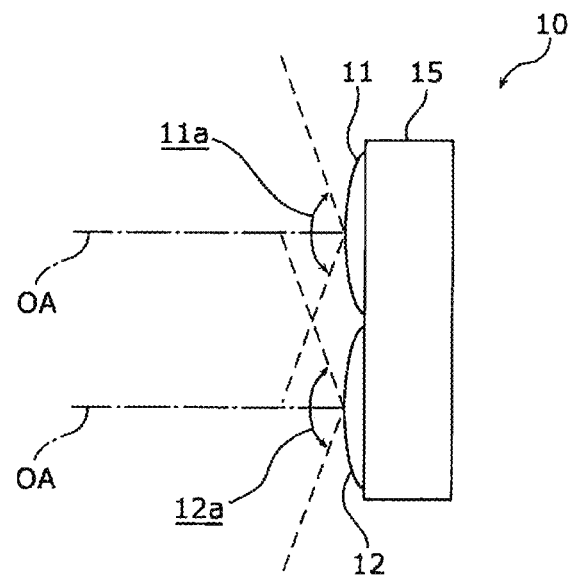
FIG. 4 is a side view of the multiple-lens camera of FIG. 3 viewed in a direction perpendicular to a lens optical axis.

Reference to FIG. 4 shows side views of the multiple-lens camera 10 of FIG. 3 viewed in a direction perpendicular to the optical axes OA of the lenses 11 and 12. As illustrated in FIG. 4, capture ranges 11a and 12a which are fields of view of the lenses 11 and 12 of the multiple-lens camera 10 at least overlaps each other. Note that in the embodiment, since the lenses 11 and 12 have the same angle of field of view, the capture ranges 11a to 12a thereof have the same shape and dimensions.

Figure 5:
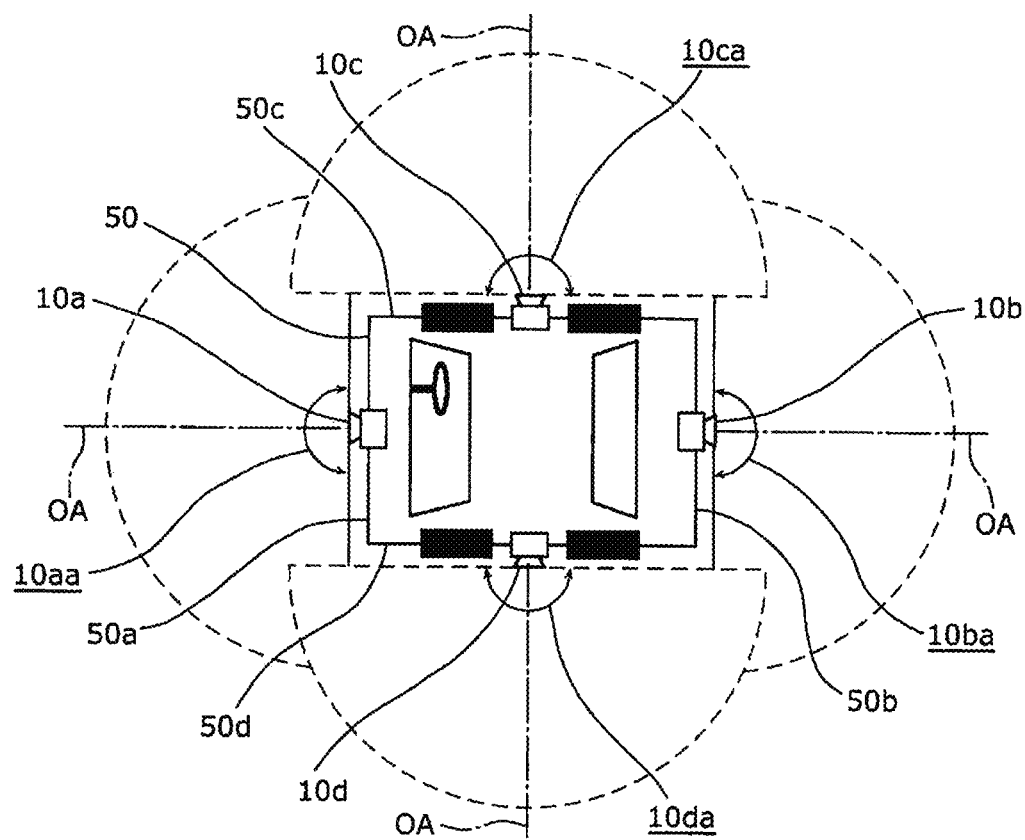
FIG. 5 is a plan view illustrating an example of mounting the multiple-lens camera of FIG. 3 on an automobile.

For example, as illustrated in FIG. 5, the above-described multiple-lens camera 10 is mounted on an automobile 50 being an example of a vehicle and can perform a function of, for example, monitoring the periphery of the automobile 50, detecting peripheral obstacles, measuring the distances to the peripheral obstacles, and assisting the driver. FIG. 5 illustrates a plan view depicting an example of mounting the multiple-lens camera 10 on the automobile 50. The four multiple-lens camera 10a, multiple-lens camera 10b, multiple-lens camera 10c, and multiple-lens camera 10d are positioned at a front part 50a, a rear part 50b, a driver seat-side part 50c, and a passenger seat-side part 50d of the automobile 50, respectively. Each of the ranges of field of view 10aa, 10ba, 10ca, and 10da of the multiple-lens camera 10a, the multiple-lens camera 10b, the multiple-lens camera 10c, and the multiple-lens camera 10d having a wide angle of field of view overlaps an adjacent range of field of view. Thus, the multiple-lens camera 10a, the multiple-lens camera 10b, the multiple-lens camera 10c, and the multiple-lens camera 10d can monitor the region all around the automobile 50 without a blind spot.

[1-1-3. Configuration of Camera Calibration Apparatus]

A description is provided for the configuration of the camera calibration apparatus 101 according to Embodiment 1. The camera calibration apparatus 101 is applicable to a multiple-lens camera including two or more lenses and to a set of two or more cameras. However, in the embodiment, a description is provided for an example where the camera calibration apparatus 101 is applied to the multiple-lens camera 10 including the two lenses 11 and 12, as described above.

Reference to FIG. 6A shows, in the form of a block diagram, an example of the functional configuration of camera calibration apparatus 101 according to Embodiment 1. The camera calibration apparatus 101 includes a calibration point data reception unit 102, a camera parameter acquiring unit 103, a view angle-corresponding length calculation unit 104, a stereo distance measurement value calculation unit 105, a camera parameter update unit 106, and a camera parameter output unit 107. The camera calibration apparatus 101 uses initial camera parameters set in the camera and calibration point data concerning the calibration point set in the three-dimensional space to update the camera parameters to optimal camera parameters for output, in other words, to calibrate the camera parameters. The initial camera parameters may be camera parameters during the design phase of the camera or may be camera parameters set in the camera when used. The camera calibration apparatus 101 can be used for camera calibration before delivery from factory and also for camera calibration in the inspection and repair of a camera.

Note that in the present specification, calibration of a camera means obtaining the camera parameters of an actual camera. Such a camera calibration apparatus 101 is also referred to as a camera parameter calculation apparatus. Details on the constituents of the camera calibration apparatus 101 is described later. Further, in the present specification, the term "coordinate pair" refers to a single combination of a coordinate for one axis and a coordinate for another axis in a two-dimensional Cartesian coordinate system, and the term "coordinate set" refers to a single combination of a coordinate for one axis, a coordinate for another axis, and a coordinate for further another axis in a three-dimensional Cartesian coordinate system.

(Calibration Point Data Reception Unit 102)

Figures 6B, 7:
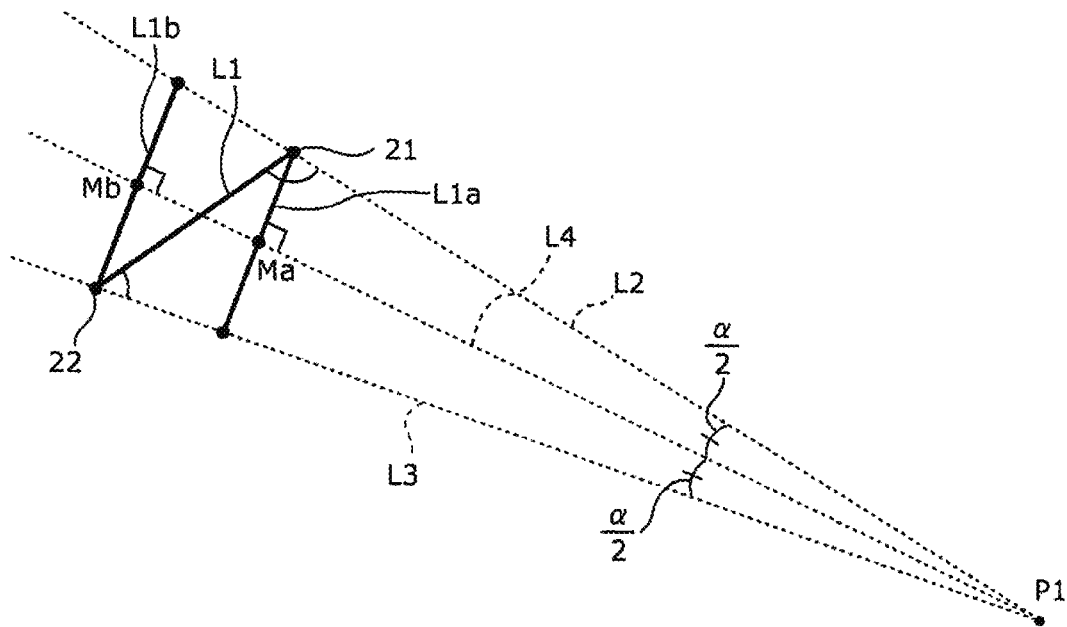
FIG. 6B is a diagram illustrating an example of calibration point data.
FIG. 7 is a diagram illustrating an example of a view angle-corresponding length used by the camera calibration apparatus according to Embodiment 1.

The calibration point data reception unit 102 receives the calibration point data and outputs the calibration point data to the view angle-corresponding length calculation unit 104. For example, the calibration point data reception unit 102 receives the calibration point data from a calibration point database (also referred to as a calibration point DB) 109. The first memory may retain the calibration point database 109. In the embodiment, the calibration point database 109 is contained in the first memory provided outside the camera calibration apparatus 101, but may be contained in a memory and the like provided in the camera calibration apparatus 101. Alternatively, the calibration point database 109 may be contained in a storage device of an apparatus or a system including the camera calibration apparatus 101, or may be contained in a storage device provided in the multiple-lens camera 10. The storage device may be a hard disc or a semiconductor memory. The calibration point data contains a three-dimensional coordinate set representing the position of the calibration point being the calibration reference point and a two-dimensional coordinate pair representing the pixel position of the point corresponding to the calibration point in the two-dimensional image including an image of the calibration point captured with each of the cameras, and the calibration point data associates the three-dimensional coordinate set representing the position of the calibration point being the calibration reference point with the two-dimensional coordinate pair representing the pixel position of the point corresponding to the calibration point in the two-dimensional image including an image of the calibration point captured with each of the cameras. FIG. 6B illustrates an example of the calibration point data. The three-dimensional coordinate set (x1, y1, z1) representing the position of the calibration point is associated with the two-dimensional coordinate pair (x211, y211) which represents the pixel position of the point corresponding to the calibration point having the three-dimensional coordinate set (x1, y1, z1) in the two-dimensional image of the calibration point having the three-dimensional coordinate set (x1, y1, z1) captured with the camera 21. The three-dimensional coordinate set (x1, y1, z1) representing the position of the calibration point is associated with the two-dimensional coordinate pair (x221, y221) which represents the pixel position of the point corresponding to the calibration point having the three-dimensional coordinate set (x1, y1, z1) in the two-dimensional image of the calibration point having the three-dimensional coordinate set (x1, y1, z1) captured with the camera 22.

The calibration point is positioned such that it is included in all of the fields of view of the cameras 21 and 22. For example, the calibration point may be expressed by use of a point having a three-dimensional coordinate set (X, Y, Z) and a point corresponding to the point and having an image coordinate pair (mx, ny) in the two-dimensional image. In this expression, multiple the calibration point data contains information on more than one calibration point. Note that m and n are each an integer and respectively represent the pixel positions in the x-axis direction and in the y-axis direction in the two-dimensional image formed by arranging pixels two-dimensionally.

Here, in order to create the calibration point data, it is necessary to associate the three-dimensional coordinate set of the calibration point in the three-dimensional space where the multiple-lens camera 10 is present with the image coordinate pair or the pixel position of the point corresponding to the calibration point in the two-dimensional image produced by capturing the calibration point in the three-dimensional space with each of the cameras 21 and 22 of the multiple-lens camera 10. To this end, the method is conventionally used which uses a calibration index such as the above-described checker pattern with a known pattern shape. In the embodiment, in the calibration point data stored in the calibration point database 109, a known method may associate the three-dimensional coordinate set of the calibration point with the image coordinate pair or the pixel position of the point corresponding to the calibration point in the two-dimensional image. The known method may be the method described using FIG. 2. Such calibration point data is created in advance and is stored in the calibration point database 109.

(Camera Parameter Acquiring Unit 103)

The camera parameter acquiring unit 103 acquires the initial camera parameters of each of the cameras 21 and 22 of the multiple-lens camera 10 to be calibrated and outputs the initial camera parameters to the view angle-corresponding length calculation unit 104. The initial camera parameters include the internal parameters and the external parameters of the cameras 21 and 22. The initial camera parameters are camera parameters preset prior to calibration.

The initial camera parameters may be design parameters set during the design phase of the cameras 21 and 22 of the multiple-lens camera 10 or may be camera parameters already set in the cameras 21 and 22 when used the multiple-lens camera 10, for example. The initial camera parameters may be recorded in a camera parameter database 110 which is a database for the camera parameters, for example. The second memory may retain the camera parameter database 110. The camera parameter acquiring unit 103 refers to the camera parameter database 110 and acquires the initial camera parameters recorded in the camera parameter database 110. Examples of the initial camera parameters are the camera parameters included in Equation 1 described above. In the embodiment, the camera parameter database 110 is contained in the second memory provided outside the camera calibration apparatus 101, but may be contained in the memory and the like provided in the camera calibration apparatus 101. Alternatively, the camera parameter database 110 may be contained in a storage device of an apparatus or a system including the camera calibration apparatus 101, or may be contained in a storage device provided in the multiple-lens camera 10. The storage device may be a hard disc or a semiconductor memory.

Alternatively, the initial camera parameters may be presumed by using the known method disclosed in Non-Patent Document 1 by Tsai or Non-Patent Document 2 by Zhang. The initial camera parameters may be presumed by pairing the coordinate set of a point in the world coordinate system with the coordinate pair of the point in the image coordinate system associated with the point in the world coordinate system by use of a calibration index such as a checker pattern. The accuracy presumed may be rough because calibration is performed thereafter. Note that the method of Non-Patent Document 1 (Tsai) and the method of Patent Document 2 (Zhang) require different information.

For example, calculation of the initial camera parameters by use of the method of Non-Patent Document 1 (Tsai) requires thirteen or more pairs each including the coordinate set of a point in the world coordinate system and the coordinate pair of the point in the image coordinate system. In addition, calculation of the initial camera parameters by use of the method of Non-Patent Document 2 (Zhang) requires three or more two-dimensional images and thirteen or more pairs each including the coordinate set of a point in the world coordinate system and the coordinate pair of the point in the image coordinate system.

(View Angle-Corresponding Length Calculation Unit 104)

Based on the initial camera parameters, the view angle-corresponding length calculation unit 104 calculates the view angle-corresponding length of the pair of cameras 21 and 22 of the multiple-lens camera 10 for each of the calibration points contained in the calibration point data received from the calibration point data reception unit 102. To be more specific, view angle-corresponding lengths are calculated the number of which is equal to the number of calibration points.

From what has been described in "Underlying Knowledge Forming Basis of the Present Disclosure", the view angle-corresponding length for the pairs of cameras included in the cameras 21 and 22 corresponds to the angle of view formed by viewing the calibration point from any two cameras and can be defined as the length which correlates to the angle of view. The view angle-corresponding length varies depending on the size of the angle of view. In the embodiment, the view angle-corresponding length is 2 L sin(angle of view/2). Note that L is the distance between the central position of the lens of any of the two cameras and the calibration point.

Here, with reference to FIG. 7, a description is provided for the view angle-corresponding length in the three-dimensional space in the embodiment taking the cameras 21 and 22 as an example. Note that FIG. 7 is a diagram illustrating an example of the view angle-corresponding length used by the camera calibration apparatus 101 according to Embodiment 1. The reference line length between the cameras 21 and 22 is the distance between the centers of the lenses of the cameras 21 and 22 and is the length of the line segment L1 connecting the center of the lens of the camera 21 and the center of the lens of the camera 22. Note that the center of a lens may be considered as one of the intersections of the lens optical axes and the lens surfaces that is nearer the calibration point. The "distance from * to a camera" may be the "distance from * to the center of the lens of a camera". The "distance from a camera to *" may be the "distance from the center of the lens of a camera to *". In the example, since the cameras 21 and 22 have different distances to the calibration point P1, the view angle-corresponding length between the cameras 21 and 22 for the angle of view formed by viewing the cameras 21 and 22 from the calibration point P1 is different from the length of the line L1 being the reference line length between the cameras 21 and 22. If the distance from the calibration point P1 to the camera 21 and the distance from the calibration point P1 to the camera 22 are the same, the reference line length and the view angle-corresponding length coincide with each other.

To be more specific, the view angle-corresponding length can be the length of a line segment L1a passing through the center (specifically, the center of projection) of the lens of the camera 21 or the length of a line segment L1b passing through the center (specifically, the center of projection) of the lens of the camera 22. The line segment L1a passes through the center of the lens of the camera 21 and is perpendicular to a line L4 being the bisector of an internal angle α formed by lines L2 and L3. Moreover, the endpoints of the line segment L1a are the intersections with the lines L2 and L3. The internal angle α is the angle of view formed by the lines of sight of the cameras 21 and 22 when viewing the calibration point P1 from the cameras 21 and 22. The line L4 passes through a midpoint Ma of the line segment L1a and is a bisector perpendicular to the line segment L1a. Note that the line L2 is a line connecting the calibration point P1 and the center of the lens of the camera 21. The line L3 is a line connecting the calibration point P1 and the center of the lens of the camera 22. In addition, the line segment L1b passes through the center of the lens of the camera 22 and is perpendicular to the line L4. Moreover, the endpoints of the line segment L1b are the intersections with the lines L2 and L3. The line L4 passes through a midpoint Mb of the line segment L1b and is a bisector perpendicular to the line segment L1b.

The length of the line segment L1a is also the length of the chord of the circular sector in which the angle of view α is the central angle and which has an arc passing through the center of the lens of the camera 21. The length of the line segment L1b is also the length of the chord of the circular sector in which the angle of view α formed by the line L2 and the line L3 is the central angle and which has an arc passing through the center of the lens of the camera 22. As described above, the view angle-corresponding length is 2 L sin(angle of view/2). Note that L is the length between the central position of any of the lenses of the two cameras and the calibration point.

The view angle-corresponding length is not limited to the length of the line segment L1a or the length of the line segment L1b. For example, the view angle-corresponding length may be the length of the chord of any circular sector having the angle of view α as the central angle. For example, the view angle-corresponding length may be the length of the chord between the lines L1a and L1b. Note that the points and the lines illustrated in FIG. 7 are positioned on the same plane (sheet).

In addition, the view angle-corresponding length may be substituted with the angle of view α correlated thereto. The variation of the angle of view α can represent the variation of the view angle-corresponding length and corresponds one-to-one to the variation of the view angle-corresponding length. To be more specific, if the angle of view α becomes larger, the view angle-corresponding length becomes larger, and the angle of view α becomes smaller, the view angle-corresponding length becomes smaller. The view angle-corresponding length can be calculated using the angle of view α and the distance between the calibration point P1 and the center of the lens of the camera 21 or 22.

(Stereo Distance Measurement Value Calculation Unit 105)

The stereo distance measurement value calculation unit 105 acquires the results of capturing the calibration points with the cameras 21 and 22 from the calibration point data reception unit 102. To be more specific, the stereo distance measurement value calculation unit 105 receives the calibration point data from the calibration point data reception unit 102. As illustrated in FIG. 6B, the calibration point data contains the three-dimensional coordinate set of a calibration point and the pixel position of the point corresponding to the calibration point in the two-dimensional image of the calibration point captured with each of the cameras. The stereo distance measurement value calculation unit 105 acquires an image coordinate pair corresponding to the calibration point in each of the images captured with the cameras 21 and 22 as the camera pair from the calibration point data. In addition, the stereo distance measurement value calculation unit 105 acquires the camera parameters of each of the cameras 21 and 22. The stereo distance measurement value calculation unit 105 uses the camera parameters of the cameras 21 and 22 and the image coordinate pairs of the points corresponding to the calibration point acquired by the cameras 21 and 22 to calculate the three-dimensional coordinate set of the calibration point by image processing employing a stereo distance measurement technique. In the following description, the point having the three-dimensional coordinate set corresponding to the above-described calibration point is referred to as a measurement point, and the three-dimensional coordinate set of a measurement point is also referred to as a stereo distance measurement value. For example, the camera 21 and the camera 22 each capture an image including the calibration point. Here, let the three-dimensional coordinate set of the calibration point be (x2, y2, z2) (see FIG. 6B). Image processing employing the later-described stereo distance measurement technique uses an image captured with the camera 21, an image captured with the camera 22, the pixel coordinate pair (x212, y212) corresponding to this calibration point in the image captured with the camera 21, and the pixel coordinate pair (x222, y222) corresponding to this calibration point in the image captured with the camera 22, and thereby calculates the measurement point corresponding to the calibration point identified with the three-dimensional coordinate set (x2, y2, z2).

The stereo distance measurement technique is described considering the camera model of the camera 21 and the camera 22 as a pinhole camera model of Equation 1. Equation 1 uniquely determines the image coordinate pair (x, y) which is a projection of the world coordinate set (X, Y, Z) onto an image, but cannot uniquely calculate the world coordinate set (X, Y, Z) from the image coordinate pair (x, y) and the camera parameters. It is possible to calculate only the directional vector of a line λ (sight line vector V) on which the world coordinate set (X, Y, Z) can be present. The lines λ of the camera 21 and the camera 22 are denoted by λ21 and λ22, respectively, and the sight line vectors of the camera 21 and the camera 22 are denoted by V21 and V22, respectively. If there are no errors in the camera parameters and the calibration point, the line λ21 and the line λ22 intersect with each other at one point, and the three-dimensional coordinate set of the intersection represents the measurement point (x2, y2, z2). On the other hand, if there are errors, the line λ21 and the line λ22 are skew. Thus, it suffices to calculate a point ω21 on the line λ21 and a point ω22 on the line λ22 such that the distance between the point ω21 and the point ω22 is minimized and then to determine the midpoint between the point ω21 and the point ω22, the point ω21, or the point ω22 as the measurement point (x2, y2, z2). If a line λ23 passing through the point ω21 and the point ω22 perpendicularly intersects both with the line λ21 and the line λ22, it is possible to calculate each of the point ω21 and the point ω22 which minimize the distance therebetween as a position vector starting from the origin O of the world coordinate system, as expressed in Equation 10. Here, the world coordinate sets of the camera positions of the camera 21 and the camera 22 are denoted by P21 and P22, respectively, and X-components, Y-components, and Z-components of the world coordinate sets of P21 and P22 are the camera parameters $T_X$, $T_Y$, and $T_Z$ of the camera 21 and the camera 22.

$$\overrightarrow{O\omega_{21}} = \eta_{21}\overrightarrow{V_{21}} + \overrightarrow{OP_{21}} \quad \text{(Equation 10)}$$
$$\overrightarrow{O\omega_{22}} = \eta_{22}\overrightarrow{V_{22}} + \overrightarrow{OP_{22}}$$
$$\begin{bmatrix}\eta_{21}\\\eta_{22}\end{bmatrix} = \begin{bmatrix}|\overrightarrow{V_{21}}|^2 & -\overrightarrow{V_{21}}\cdot\overrightarrow{V_{22}}\\\overrightarrow{V_{21}}\cdot\overrightarrow{V_{22}} & -|\overrightarrow{V_{22}}|^2\end{bmatrix}^{-1}\begin{bmatrix}\overrightarrow{V_{21}}\cdot\overrightarrow{P_{22}P_{21}}\\\overrightarrow{V_{22}}\cdot\overrightarrow{P_{22}P_{21}}\end{bmatrix}$$

Except the case where V21 and V22 are parallel to each other, it is possible to calculate the inverse matrix contained in Equation 10.

One measurement point is formed for each calibration point. Note that the stereo distance measurement technique described above is a stereo image recognition technique which calculates the three-dimensional coordinate set of the calibration point using the difference in position, specifically parallax of the calibration point on two captured images captured with two cameras. Any known technique is applicable to the stereo distance measurement technique.

(Camera Parameter Update Unit 106)

The camera parameter update unit 106 acquires the calibration point data on the calibration points from the calibration point data reception unit 102, acquires the initial camera parameters of the cameras 21 and 22 from the camera parameter acquiring unit 103, and acquires the three-dimensional coordinate set of the measurement point corresponding to each calibration point from the stereo distance measurement value calculation unit 105. By using the acquired information, the camera parameter update unit 106 determines the necessity to change, specifically to update the camera parameters of the cameras 21 and 22 to new camera parameters. If update is necessary, the camera parameter update unit 106 newly calculates the camera parameters of the cameras 21 and 22. In the above determination, the camera parameter update unit 106 uses the acquired information to calculate the distance measurement error which is a difference in position between the calibration point and the measurement point for each of the calibration points, and moreover to calculate the evaluation value using the distance measurement error. Then, based on the evaluation value, the camera parameter update unit 106 determines whether or not to update the camera parameters. The details of the camera parameter update unit 106 are described later.

(Camera Parameter Output Unit 107)

The camera parameter output unit 107 outputs the camera parameters calculated by the camera parameter update unit 106. For example, the camera parameter output unit 107 may output the camera parameters to an apparatus and the like included in the camera calibration apparatus 101.

The camera calibration apparatus 101 may be, for example, a computer device (not illustrated) including a processor, a memory, an interface circuit, and the like. At least one of the functions of the above-described constituents of the camera calibration apparatus 101 may be, for example, a software function performed by a processor executing a program recorded in a memory in advance. In addition, the camera calibration apparatus 101 may be a hardware circuit (not illustrated) dedicated for the above-described operations. The program may be provided by, for example, communications via a communication network such as the Internet or communications supported by mobile communication standards.

In addition, the camera calibration apparatus 101 does not necessarily have to be a single computer device, but may be a distributed processing system (not illustrated) including a terminal device and a server. As an example, the calibration point data reception unit 102 and the camera parameter acquiring unit 103 may be provided in the terminal device, and some or all of the functions of the view angle-corresponding length calculation unit 104, the stereo distance measurement value calculation unit 105, the camera parameter update unit 106 may be executed on the server. In this case, data is transferred among the constituents via communication lines connected to the terminal device and the server.

[1-2. Operations of Camera Calibration Apparatus]

Figure 8:
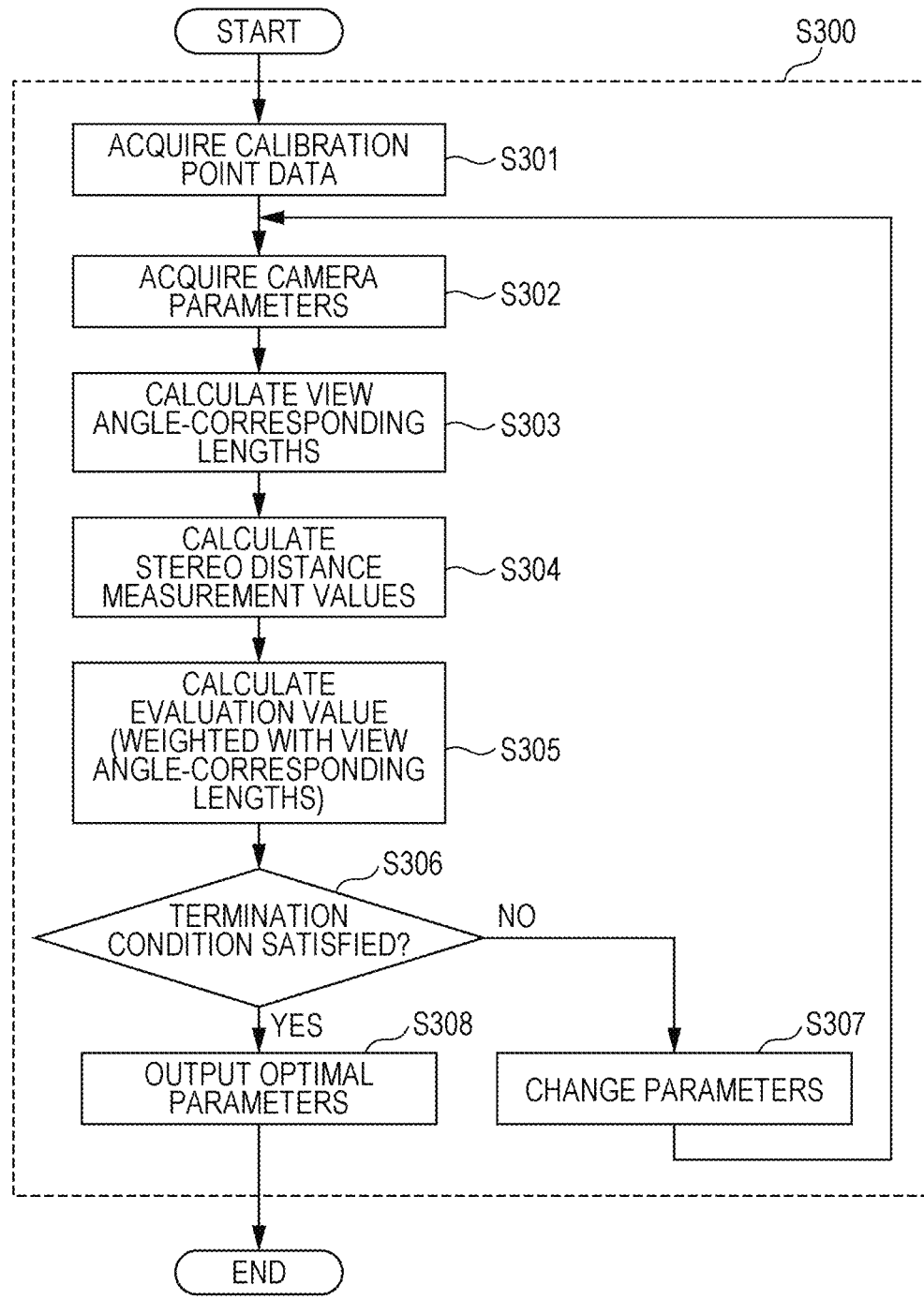
FIG. 8 is a flowchart illustrating an example of operation flow of the camera calibration apparatus according to Embodiment 1.

With reference to FIG. 8, a description is provided for the operations of the camera calibration apparatus 101 according to Embodiment 1. Note that FIG. 8 is a flowchart illustrating an example of the operation flow of the camera calibration apparatus 101 according to Embodiment 1. To be more specific, a description is provided for calculation processing for the camera parameters by the camera calibration apparatus 101. The processing at step S300 being the calculation processing for the camera parameters includes steps S301 to S308 as follows.

(Step S301)

First, the calibration point data reception unit 102 of the camera calibration apparatus 101 acquires the calibration point data on a calibration point to be used for camera calibration from the calibration point database 109, and outputs the calibration point data to the view angle-corresponding length calculation unit 104. The calibration point database 109 stores in combination the three-dimensional coordinate set and the image coordinate pair of each of the calibration points. The image coordinate pair of each calibration point is acquired in advance by capturing the calibration point using the cameras 21 and 22 of the multiple-lens camera 10.

(Step S302)

In addition, the camera parameter acquiring unit 103 of the camera calibration apparatus 101 acquires the initial camera parameters of the cameras 21 and 22 of the multiple-lens camera 10 to be used for camera calibration from the camera parameter database 110. To be more specific, the camera parameter acquiring unit 103 acquires information on the cameras 21 and 22 as information on the calibration targets and further refers to the camera parameter database 110 for the information on the cameras 21 and 22 being the calibration targets to acquire the camera parameter database 110 associated with the cameras 21 and 22. The initial camera parameters are acquired in advance by, for example, using the design values of the camera parameters of the cameras 21 and 22 or by measuring the camera parameters of the cameras 21 and 22 in a test and the like. The initial camera parameters are then stored in the camera parameter database 110. As described later, the camera parameter acquiring unit 103 might acquire the updated camera parameters from the camera parameter update unit 106 in some cases.

(Step S303)

After steps S301 and S302, the view angle-corresponding length calculation unit 104 of the camera calibration apparatus 101 calculates the view angle-corresponding lengths for the cameras 21 and 22 based on the initial camera parameters of the cameras 21 and 22 for each of the calibration points contained in the calibration point data. Note that in the case of update by the camera parameter update unit 106, the view angle-corresponding length calculation unit 104 calculates the view angle-corresponding lengths based on the updated camera parameters.

For example, in the case of FIG. 7, the view angle-corresponding length calculation unit 104 acquires the three-dimensional coordinate set of a calibration point (in this example, the calibration point P1) selected from multiple calibration points and the three-dimensional coordinate sets of the cameras 21 and 22 being the calibration targets. The three-dimensional coordinate set of a camera can be acquired from the external parameters of the camera parameters (in the case of Equation 1, $T_X$, $T_Y$, and $T_Z$ correspond to the X-coordinate, the Y-coordinate, and the Z-coordinate of the three-dimensional coordinate set of the camera), and represents the central position of the lens of the camera. Next, the view angle-corresponding length calculation unit 104 uses the three-dimensional coordinate set of the calibration point P1 and the three-dimensional coordinate sets of the cameras 21 and 22 to obtain a triangle formed on the two-dimensional plane defined by the three-dimensional coordinate set of the calibration point P1 and the three-dimensional coordinate sets of the cameras 21 and 22. In this example, the camera 21 is closer to the calibration point P1 than the camera 22 is. The view angle-corresponding length calculation unit 104 calculates, for example, the view angle-corresponding length based on the distance between the calibration point P1 and the position of the camera 21, specifically, the length of the line L1a on the two-dimensional plane where the formed triangle lies.

(Step S304)

After step S303, the stereo distance measurement value calculation unit 105 of the camera calibration apparatus 101 processes stereo distance measurement based on the calibration point data acquired from the calibration point data reception unit 102 and the initial camera parameters of the cameras 21 and 22 acquired from the camera parameter acquiring unit 103, and acquires the three-dimensional coordinate set of the measurement point corresponding to each calibration point. The stereo distance measurement value calculation unit 105 calculates the three-dimensional coordinate set of a measurement point for all calibration points. In other words, the stereo distance measurement value calculation unit 105 calculates the stereo distance measurement values of the calibration points. Note that in the case of update by the camera parameter update unit 106, the stereo distance measurement value calculation unit 105 processes stereo distance measurement based on the updated camera parameters.

Figure 9:
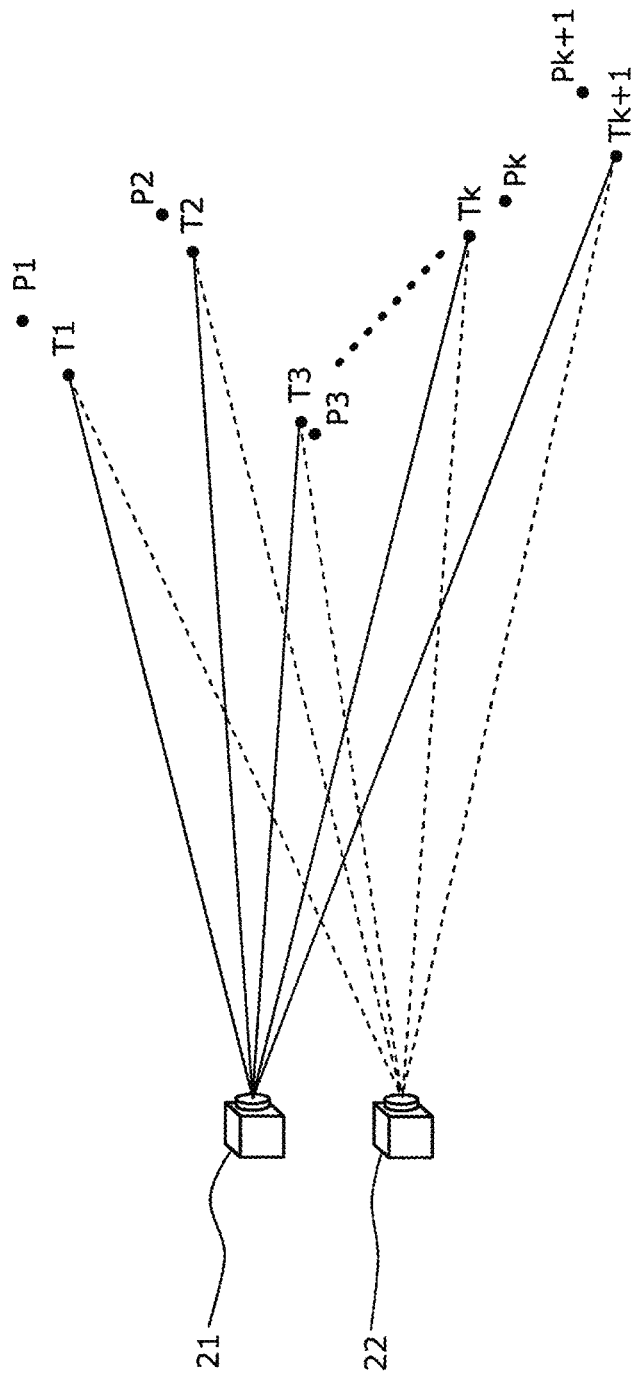
FIG. 9 is a diagram illustrating an example of a relationship among cameras to be calibrated by the camera calibration apparatus according to Embodiment 1, a calibration point, and measurement points of the calibration point.

For example, reference to FIG. 9 shows an example of the positional relationship between calibration point Pk (k=1, 2, . . . , N) and the measurement point Tk (k=1, 2, . . . , N) of the calibration point Pk acquired by stereo distance measurement. Note that FIG. 9 is a diagram illustrating an example of the relationship among the cameras 21 and 22 to be calibrated by the camera calibration apparatus 101 according to Embodiment 1, the calibration point Pk, and the measurement point Tk of the calibration point Pk. The position of the calibration point Pk is a three-dimensional position determined by the three-dimensional coordinate set contained in the calibration point data. The measurement point Tk is a point acquired by stereo distance measurement of the calibration point Pk using the cameras 21 and 22. If there are errors in the camera parameters of the cameras 21 and 22, there can arise a difference between the three-dimensional position of the calibration point Pk and each of the three-dimensional position of the measurement point Tk, as illustrated in FIG. 9.

(Step S305)

After step S304, the camera parameter update unit 106 of the camera calibration apparatus 101 calculates an evaluation value J which is related to the difference in position between the calibration point and the measurement point based on the calibration point data on the calibration points acquired at step S301, the view angle-corresponding lengths calculated at step S303, and the three-dimensional coordinate sets of the measurement points calculated at S304. Note that the evaluation value J is calculated using the function indicated in Equation 3 below (referred to as an evaluation function). To be more specific, the evaluation value J is defined as a weighted sum of three-dimensional distances (Euclidean distances). Each of the three-dimensional distances is provided between the calibration point and the measurement point corresponding to the calibration point. The three-dimensional distance between the calibration point and the measurement point is also a distance measurement error and is referred to as a stereo distance measurement error. For example, as illustrated in FIG. 9, there can arise a three-dimensional distance between the calibration point Pk and the measurement point Tk of the calibration point Pk attributed to errors and the like of the camera parameters. Note that N in Equation 3 is the number of calibration points and wk is the weight given on the Euclidean distance between the calibration point Pk and the measurement point Tk. $T_k$ is the three-dimensional coordinate set of the measurement point Tk, and $P_k$ is the three-dimensional coordinate set of the calibration point Pk. In the embodiment, as indicated in Equation 4 below, the weight $w_k$ represents the view angle-corresponding length $d_{eff,k}$ of the cameras 21 and 22 for the measurement point Tk. For example, $w_2$ is the view angle-corresponding length for the angle of view of the camera 21 and the camera 22 when viewed from the calibration point P2 in FIG. 9.

$$J = \frac{1}{N}\sum_{k=1}^{N} w_k \parallel T_k - P_k \parallel_2 \quad \text{(Equation 3)}$$

$$w_k = d_{eff,k} \quad \text{(Equation 4)}$$

(Step S306)

After step S305, as a result of the processing at step S305, the camera parameter update unit 106 determines whether or not the condition for terminating the update of the camera parameters are satisfied. If the termination condition is satisfied (YES at step S306), the camera parameter update unit 106 does not change the camera parameters but outputs information such as the determination result to the camera parameter output unit 107 of the camera calibration apparatus 101, and proceeds to the processing at step S308. If the termination condition is not satisfied (NO at step S306), the camera parameter update unit 106 proceeds to the processing at step S307. The termination condition may be at least one of the conditions that calculation of the evaluation value J within a search range for the preset camera parameters is completed, that the evaluation value J is smaller than a first threshold, and that the number of iterations of the sequence of processes from step S302 to S307 is equal to or more than a second threshold.

The completion of the calculation of the evaluation value J within the search range for the camera parameters means the completion of performing all possible search conditions for predetermined search conditions. For example, consider the case of searching only the focal length (one variable) within its search range of 1.10 to 1.30 mm at equal intervals with a step size of 0.01 mm (referred to as grid search). It suffices to calculate the evaluation value for 21 focal length values. In addition, in the case of searching more than one variable, it is necessary to perform calculation for all sets of variables with possible values. For example, if the number of variables is three and each search range is divided into 10 step sizes, it is necessary to calculate the evaluation value $11^3$ times.

The above-described number of iterations of the sequence of processes is also the number of updates of the camera parameters. The above-described first threshold can be set as appropriate based on the tolerable errors in the three-dimensional positions of the measurement points relative to the calibration point. The above-described second threshold may be set in consideration of the processing speed of the entire camera calibration apparatus 101 and empirical data, for example. The second threshold may be about 100 times, for example. Alternatively, the above-described second threshold may be a value which enables presumption that the change in the evaluation value J has converged based on the change in the evaluation value J due to the iteration processing, specifically the gradient of the evaluation value J. (Step S307)

The camera parameter update unit 106 changes, specifically updates the camera parameters of the cameras 21 and 22 within the search ranges of the camera parameters. When the processing at step S307 is performed for the first time, the camera parameters to be updated are the initial camera parameters. During the iteration processing to be described later, the camera parameters to be updated are the latest camera parameters updated in the process of the iteration processing. For example, the camera parameter update unit 106 uses calculation result history for the evaluation value J and the like to change the camera parameters so as to minimize or make small the evaluation value J by using a method such as the nonlinear optimization method. Then, the camera parameter update unit 106 outputs the updated camera parameters to the camera parameter acquiring unit 103 and proceeds to the processing at step S302. This repeats again the processing from step S302 to S306 using the updated camera parameters. As described above, through the repetition of the processing from step S302 to S307, the camera parameters are updated so as to minimize, specifically optimize the evaluation value J. For example, it is possible to minimize the evaluation value J using the known technique grid search. The evaluation values J are calculated at definite intervals for search ranges considered to be ranges including the optimal values such as neighborhoods of the initial camera parameters. It is possible to acquire the camera parameters which minimize the evaluation value J among the evaluation values J. Note that if the camera parameters include two or more variables as in the case of Equation 1 above, it suffices to search a multidimensional space having those variables as its axes in the same manner.

Note that the search ranges of the camera parameters are the same as the search ranges of the camera parameters used for the determination at step S306. The search range of a camera parameter is the range of a preset camera parameter. For example, the search range of each of the image central position components Cx and Cy, the focal length f, and the image sensor lengths d'x and d'y may be within ±5% of the corresponding design value. In addition, for example, the search ranges of the angle of rotation of a camera position having rotational components Rx, Ry, and Rz may be ±10 degrees relative to the initial values, and the search ranges of the translational distance of a camera position having translational components $T_X$, $T_Y$, and $T_Z$ may be ±0.2 m relative to the initial values. The initial values of the angle of rotation and the translational distance may be determined by measuring the positional relationship between the cameras 21 and 22 and the multiple-lens camera with a scale.

In addition, in order to reduce the calculation time for the iteration processing at steps S302 to S307, each of the search ranges of the camera parameters may be a range limited to a neighborhood of the corresponding initial camera parameter and may be calculated by using the gradient of the change in the evaluation value J attributed to the iteration processing by applying gradient descent and the like.
(Step S308)

The camera parameter output unit 107 acquires a set of the evaluation value J calculated at step S305 and the camera parameters of the cameras 21 and 22 corresponding to the evaluation value J. The camera parameters corresponding to the evaluation value J are the latest camera parameters as of the calculation of the evaluation value J and are also the camera parameters used in the calculation processing for the evaluation value J. If the iteration processing at steps S302 to S307 is not performed, the camera parameter output unit 107 outputs the initial camera parameters. If the iteration processing at steps S302 to S307 is performed, the camera parameter output unit 107 selects the camera parameters in the set having the smallest evaluation value from the acquired multiple sets of camera parameters and evaluation value, and outputs the selected camera parameters as the optimal camera parameters.

The above-described sequence of processes from steps S301 to S308 is the processing of calculating the calibrated camera parameters and outputting the camera parameters. These steps form a camera parameter calculation process S300.

Calibration of the cameras 21 and 22 of the multiple-lens camera 10 in accordance with the above procedures makes it possible to reduce the distance measurement errors in the measurement points at the captured image outer peripheral portion near the edge of the angle of field of view in the case of stereo distance measurement by use of the multiple-lens camera 10. This is explained sequentially in the following description. To be more specific, the view angle-corresponding length is related to the size of the distance measurement error in the stereo distance measurement.

The stereo distance measurement estimates the distance measurement error in the case where there is an angular error in the sight line vector of a camera toward the calibration point under consideration. It is impossible to analytically obtain the distribution of the distance measurement error vector because it nonlinearly spreads in the three-dimensional space. Thus, approximate calculation is carried out on a two-dimensional plane.

Figure 10:
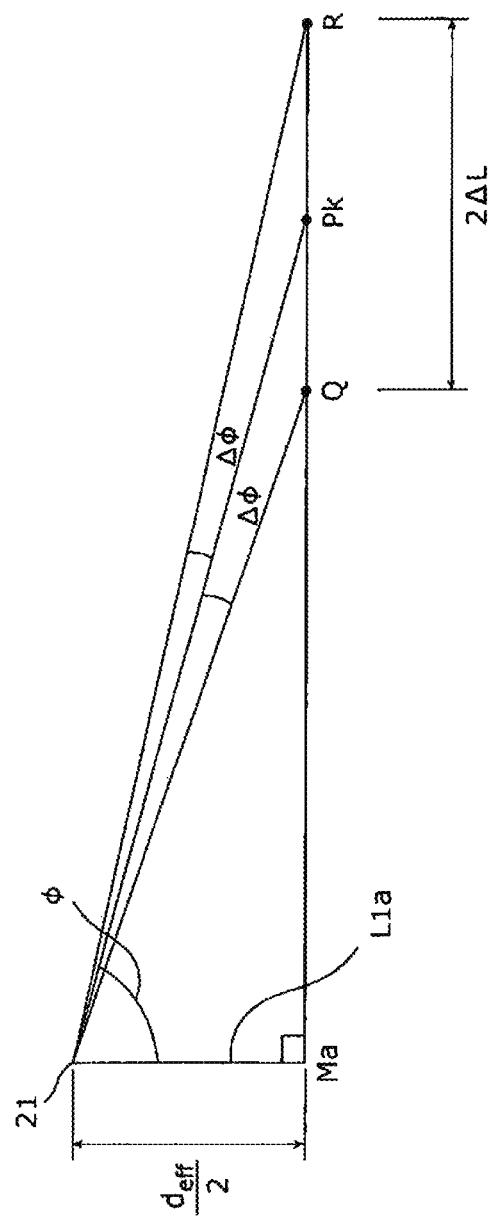
FIG. 10 is a diagram illustrating an example of a distance measurement error in stereo distance measurement using the camera of FIG. 9.

A description is provided for the distance measurement error in the measurement point Tk using FIG. 10 to take as an example the camera 21 of the multiple-lens camera 10. Note that FIG. 10 is a diagram illustrating an example of the distance measurement error in the stereo distance measurement using the camera 21 of FIG. 9. Denote by $\Delta\varphi$ the angular error in an angle $\varphi$ formed by the sight line vector of the camera 21 toward the calibration point Pk and the line L1a forming the view angle-corresponding length of the cameras 21 and 22. The positions of the measurement point Tk of the calibration point Pk when the angle $\varphi$ changes by the angular error $\Delta\varphi$ are represented by a point Q and a point R. The point Q is the position of the measurement point Tk when the angle $\varphi$ decreases by the angular error $\Delta\varphi$, and the point R is the position of the measurement point Tk when the angle $\varphi$ increases by the angular error $\Delta\varphi$. The distribution of the point Q and the point R with the calibration point Pk as the center spreads in a two-dimensional plane, and it is impossible to analytically obtain the distance between the calibration point Pk and the point Q and the distance between the point P and the point R. In light of the above, half the distance between the point Q and the point R is defined to be the distance measurement error $\Delta L$ in the measurement point Tk. Additionally, the distance measurement error $\Delta L$ defined here can be calculated in accordance with Equation 5 below.

$$\Delta L = \frac{4\Delta\phi \cdot L^2}{d_{\mathit{eff}}} \quad \text{(Equation 5)}$$

Here, in Equation 5, L is the distance from the line L1a of the camera 21 to the calibration point Pk under consideration and may also be the length of a line segment MaPk. Note that the point Ma is the same as the one in FIG. 7, and is the midpoint of the line L1a. Alternatively, L may be the distance between the calibration point Pk under consideration and the center of gravity of the cameras 21 and 22. deff is the view angle-corresponding length of the cameras 21 and 22. The conditions for satisfying the approximation calculation of Equation 5 are L>>deff, $\Delta\varphi$<<0.02 [rad], and $\varphi \neq \pi/2$ [rad]. The expression $\varphi \neq \pi/2$ [rad] means that $\varphi$ is not in a neighborhood of $\pi/2$ [rad]. For example, the condition may instead be $\varphi < 4\pi/9$ [rad]. Consider examples of the ranges involving the mathematical symbols ">>" and "<<". The expression L>>deff represents a range which satisfies deff/(L×L)≈0, and the expression $\Delta\varphi$<<0.02 [rad] represents a range which satisfies sin $\varphi \neq \varphi$ for the significant digits of the numerical value of a camera parameter to be obtained.

From Equation 5, the distance measurement error $\Delta L$ is proportional to the angular error $\Delta\varphi$, the square of the distance L to the calibration point Pk under consideration, and the inverse of the view angle-corresponding length deff. To be more specific, the view angle-corresponding length is related to the size of the distance measurement error in the measurement point. More specifically, the smaller the view angle-corresponding length, the larger the distance measurement error.

From what has been described above, the evaluation value J at step S305 corresponds to the sum of distance measurement errors weighted based on the view angle-corresponding lengths. Such an evaluation value J reduces the weight, specifically the specific gravity of the distance measurement error which increases as the view angle-corresponding length becomes shorter. For this reason, the evaluation value J contains the distance measurement error between each calibration point and its measurement point while reducing the influence of the view angle-corresponding lengths. Use of the evaluation value J makes it possible to calibrate a camera based on an evaluation result obtained by evaluating the camera parameters without being affected by a relatively large distance measurement error attributed to a calibration point positioned at the outer peripheral portion of an image captured with the camera. In addition, since the calculation of the evaluation value J uses the evaluation function defined as the total sum of the distance measurement errors for the calibration points, it is possible to calculate the camera parameters which reduce the errors in stereo distance measurement.

Embodiment 2

A description is provided for a camera calibration apparatus according to Embodiment 2. The configuration of the camera calibration apparatus according to Embodiment 2 is the same as that of Embodiment 1. Some of the operations of the camera calibration apparatus according to Embodiment 2 are different from those of Embodiment 1. To be more specific, while Embodiment 1 uses the weights wk as the view angle-corresponding lengths as indicated in Equation 4 described above when calculating the evaluation value J at step S305 of the camera parameter calculation process S300 illustrated in FIG. 8, Embodiment 2 uses the weights wk as normalized view angle-corresponding lengths. Hereinafter, Embodiment 2 is described mainly on the points different from Embodiment 1.

Figure 11:
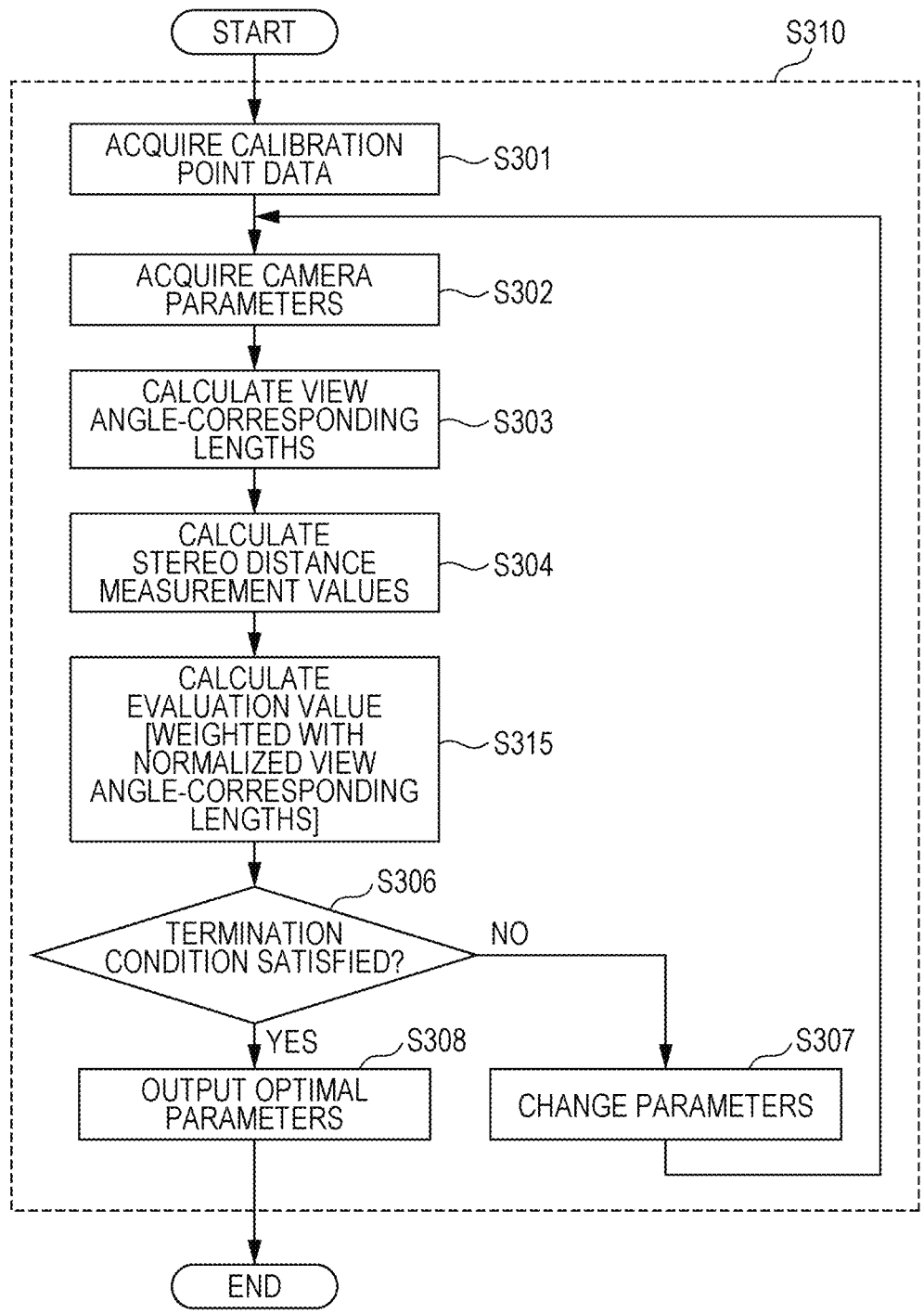
FIG. 11 is a flowchart illustrating an example of operation flow of a camera calibration apparatus according to Embodiment 2.

Reference to FIG. 11 shows a flowchart illustrating an example of the operation flow of the camera calibration apparatus according to Embodiment 2. The camera calibration apparatus according to Embodiment 2 performs a camera parameter calculation process S310. The camera parameter calculation process S310 is the same as the camera parameter calculation process S300 of Embodiment 1 except that the processing at step S315 is included instead of step S305.

Then, at step S315, the camera parameter update unit 106 calculates the evaluation value J as indicated in Equation 3 described above based on the calibration point data on the calibration points, the view angle-corresponding lengths corresponding to the respective calibration points, and the three-dimensional coordinate sets of the measurement points corresponding to the respective calibration points. Here, the camera parameter update unit 106 uses the weight wk indicated in Equation 6 below as the weight wk applied to the Euclidean distance between each calibration point and its measurement point. Note that the weight wk in Equation 6 is one normalized by the sum of view angle-corresponding lengths corresponding to a calibration point.

To be more specific, the weight wk corresponding to the Euclidean distance between the calibration point Pk and its measurement point Tk is obtained by dividing, specifically normalizing the view angle-corresponding length deff,k of the cameras 21 and 22 for the calibration point Pk by the total sum of the view angle-corresponding lengths of the cameras 21 and 22 for the calibration points. The total sum of the view angle-corresponding lengths may be calculated by the camera parameter update unit 106 or may be calculated by the view angle-corresponding length calculation unit 104 or the stereo distance measurement value calculation unit 105. In addition, after the camera parameter update unit 106 calculates the evaluation value J, processing at step S306 and the subsequent steps is performed as in the case of Embodiment 1.

$$w_k = d_{eff,k} / \sum_{u=1}^{N} d_{eff,k} \quad \text{(Equation 6)}$$

From what has been described above, the view angle-corresponding length normalized by the total sum can be used in the evaluation function as the weight independent of the total sum of the view angle-corresponding lengths. Thus, the evaluation value J is a value independent of the total sum of the view angle-corresponding lengths and is callable of accurately showing the state of the distance measurement error.

Embodiment 3

A description is provided for a camera calibration apparatus according to Embodiment 3. The configuration of the camera calibration apparatus according to Embodiment 3 is the same as that of Embodiment 1. Some of the operations of the camera calibration apparatus according to Embodiment 3 are different from those of Embodiment 1. To be more specific, while Embodiment 1 uses the weights wk as the view angle-corresponding lengths as indicated in Equation 4 described above when unifying the evaluation value J at step S305 of the camera parameter calculation process S300 illustrated in FIG. 8, the weight wk in Embodiment 3 is the corresponding view angle-corresponding length if the view angle-corresponding length is larger than a threshold and the weight wk is 0 if the corresponding view angle-corresponding length is equal to or less than the threshold. Hereinafter, Embodiment 3 is described mainly on the points different from Embodiment 1.

Figure 12:
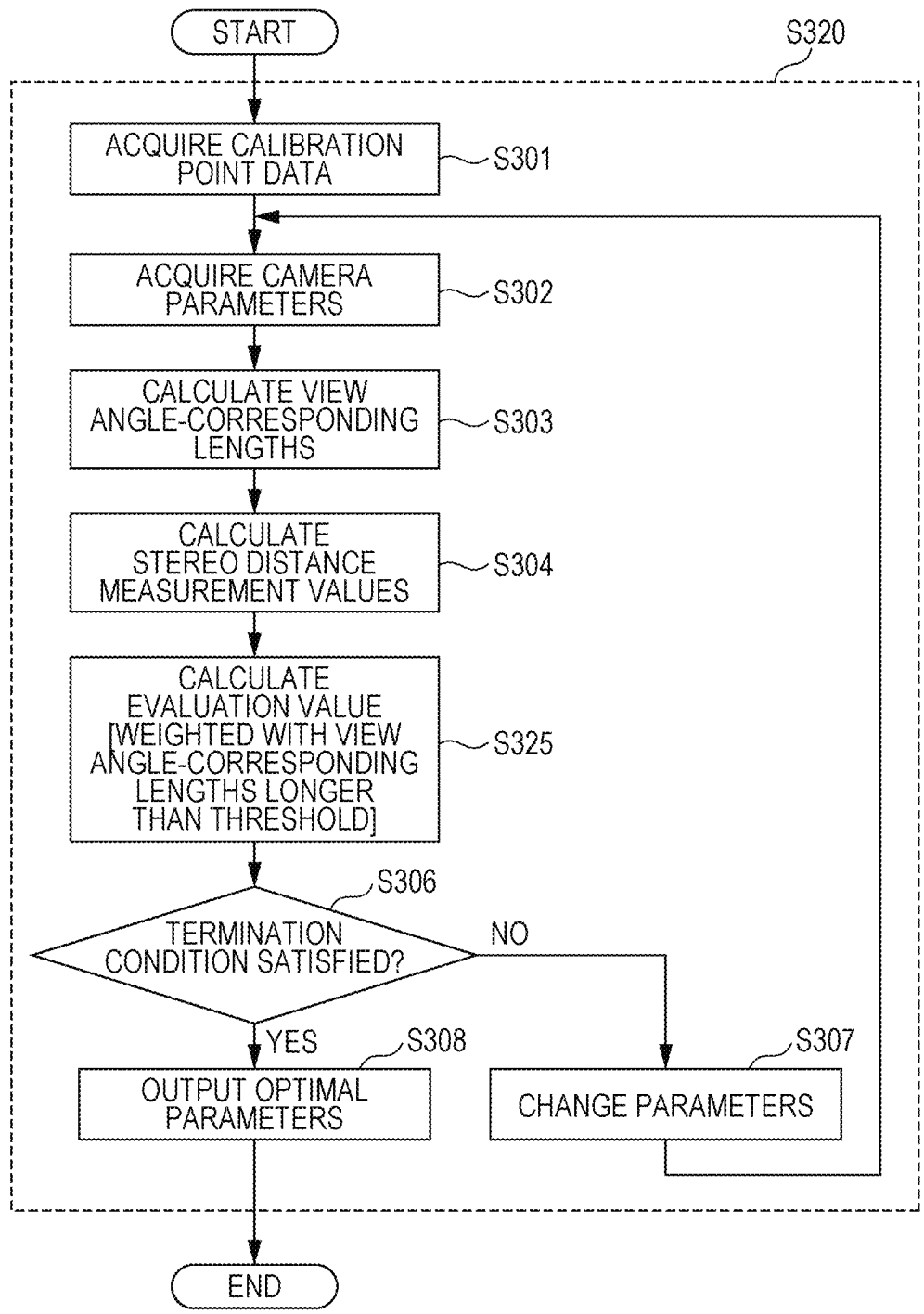
FIG. 12 is a flowchart illustrating an example of operation flow of a camera calibration apparatus according to Embodiment 3.

Reference to FIG. 12 shows a flowchart illustrating an example of the operation flow of the camera calibration apparatus according to Embodiment 3. The camera calibration apparatus according to Embodiment 3 performs a camera parameter calculation process S320. The camera parameter calculation process S320 is the same as in Embodiment 1 except that the processing at step S325 is included instead of step S305.

Then, at step S325, the camera parameter update unit 106 calculates the evaluation value J as indicated in Equation 3 described above based on the calibration point data on the calibration points, the view angle-corresponding lengths corresponding to the respective calibration points, and the three-dimensional coordinate sets of the measurement points corresponding to the respective calibration points. Here, the camera parameter update unit 106 uses the weight wk indicated in Equation 7 below as the weight wk applied to the Euclidean distance between each calibration point and its measurement point. Regarding the weight wk in Equation 7, the view angle-corresponding length is applied if the view angle-corresponding length is larger than a threshold α and 0 is applied if the view angle-corresponding length is equal to or less than the threshold α based on the view angle-corresponding lengths corresponding to the respective calibration points. To be more specific, the view angle-corresponding length deff,k or 0 is applied depending on whether or not the view angle-corresponding length deff,k of the cameras 21 and 22 for the calibration point Pk to which the weight wk is applied exceeds the threshold α.

$$w_k = \begin{cases} d_{eff,k} & (d_{eff,k} > \alpha) \\ 0 & (d_{eff,k} \leq \alpha) \end{cases} \quad \text{(Equation 7)}$$

An example of the threshold α may be 10% of the reference line length of the stereo camera, specifically the reference line length of the cameras 21 and 22. Note that the weights wk may be normalized as in Embodiment 2 such that the total sum thereof is 1.

From what has been described above, as indicated by the relationship between a view angle-corresponding length and a distance measurement error in a measurement point in Equation 5 described above, it is possible to remove a calibration point which causes the distance measurement error to diverge to infinity due to the extreme shortness of the view angle-corresponding length. This makes it possible to improve the distance measurement accuracy near the multiple-lens camera 10, specifically near the vehicle body in the case where, for example, the multiple-lens camera 10 is used on a vehicle.

Embodiment 4

A description is provided for a camera calibration apparatus according to Embodiment 4. The configuration of the camera calibration apparatus according to Embodiment 4 is the same as that of Embodiment 1. Some of the operations of the camera calibration apparatus according to Embodiment 4 are different from those of Embodiment 1. To be more specific, in Embodiment 1, the weight wk used to unify the measurement points at step S305 of the camera parameter calculation process S300 illustrated in FIG. 8 is the view angle-corresponding length as indicated in Equation 4 described above. In Embodiment 4, the weight wk is a value which is the view angle-corresponding length divided by the depth of the calibration point. Hereinafter, Embodiment 4 is described mainly on the points different from Embodiment 1.

Figure 13:
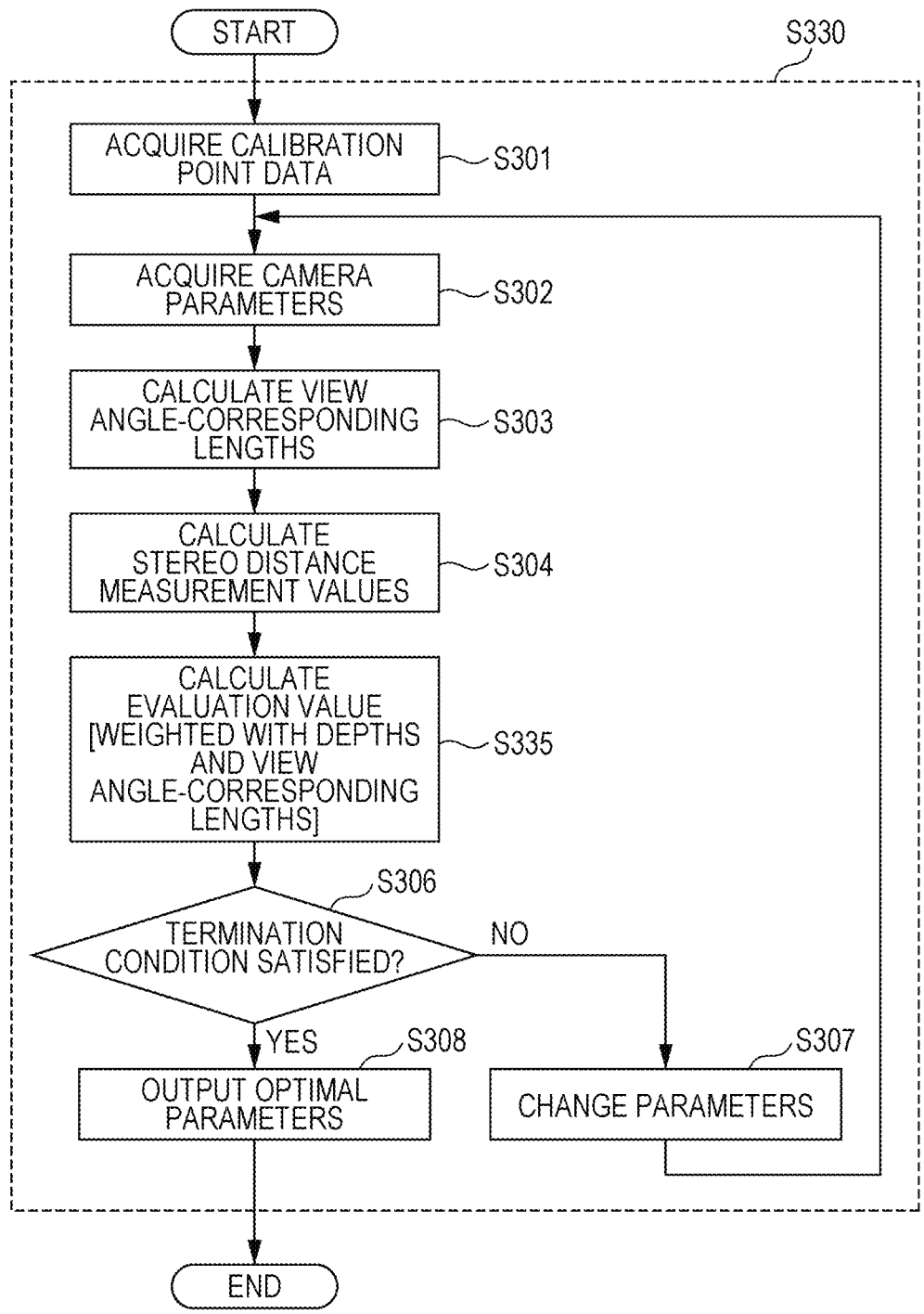
FIG. 13 is a flowchart illustrating an example of operation flow of a camera calibration apparatus according to Embodiment 4.

Reference to FIG. 13 shows a flowchart illustrating an example of the operation flow of the camera calibration apparatus according to Embodiment 4. The camera calibration apparatus according to Embodiment 4 performs a camera parameter calculation process S330. The camera parameter calculation process S330 is the same as in Embodiment 1 except that the processing at step S335 is included instead of step S305.

Then, at step S335, the camera parameter update unit 106 calculates the evaluation value J as indicated in Equation 3 described above based on the calibration point data on the calibration points, the view angle-corresponding lengths corresponding to the respective calibration points, and the three-dimensional coordinate sets of the measurement points corresponding to the respective calibration points. Here, the camera parameter update unit 106 uses the weight wk indicated in Equation 8 below as the weight wk applied to the Euclidean distance between each calibration point and its measurement point. The weight wk in Equation 8 is the view angle-corresponding length corresponding to each calibration point divided by the depth of that calibration point.

$$w_t = \frac{d_{\mathit{eff},t}}{L_k} \qquad \text{(Equation 8)}$$

Here, Lk is the depth of the k-th calibration point Pk. As in the case of L in Equation 5 described above, the depth Lk may be the distance from the line corresponding to the view angle-corresponding length of the cameras 21 and 22 to the calibration point Pk or may be the distance from the position of the center of gravity of the cameras 21 and 22 to the calibration point Pk. In addition, for example, the depth Lk may be the distance between the calibration point Pk and any of the cameras 21 and 22. The camera parameter update unit 106 may be configured to calculate the depth Lk using the camera parameters of the cameras 21 and 22 and the three-dimensional coordinate set of the calibration point Pk. Note that the weights wk may be normalized as in Embodiment 2 such that the total sum thereof is 1.

If the depth of the calibration point, specifically the distance between the calibration point and the multiple-lens camera becomes larger, the errors in the camera parameters more greatly affect the distance measurement errors in the measurement points. However, the above-described weight wk makes it possible to reduce the situation where the contribution of the distance measurement errors to the evaluation value J is biased to a relatively large distance measurement error attributed to a distant calibration point. Thus, it is possible to obtain an evaluation value J with reduced influence of the depth of calibration point.

Embodiment 5

A description is provided for a camera calibration apparatus according to Embodiment 5. The configuration of the camera calibration apparatus according to Embodiment 5 is the same as that of Embodiment 4. Some of the operations of the camera calibration apparatus according to Embodiment 5 are different from those of Embodiment 4. To be more specific, while the weight wk used to calculate the evaluation value J is a value which is the view angle-corresponding length divided by the depth of calibration point in Embodiment 4, Embodiment 5 uses a weight wk which is a value being the view angle-corresponding length divided by the square of the depth of calibration point. Hereinafter, a description is provided for Embodiment 5 focusing on the points different from Embodiment 4.

Figure 14:
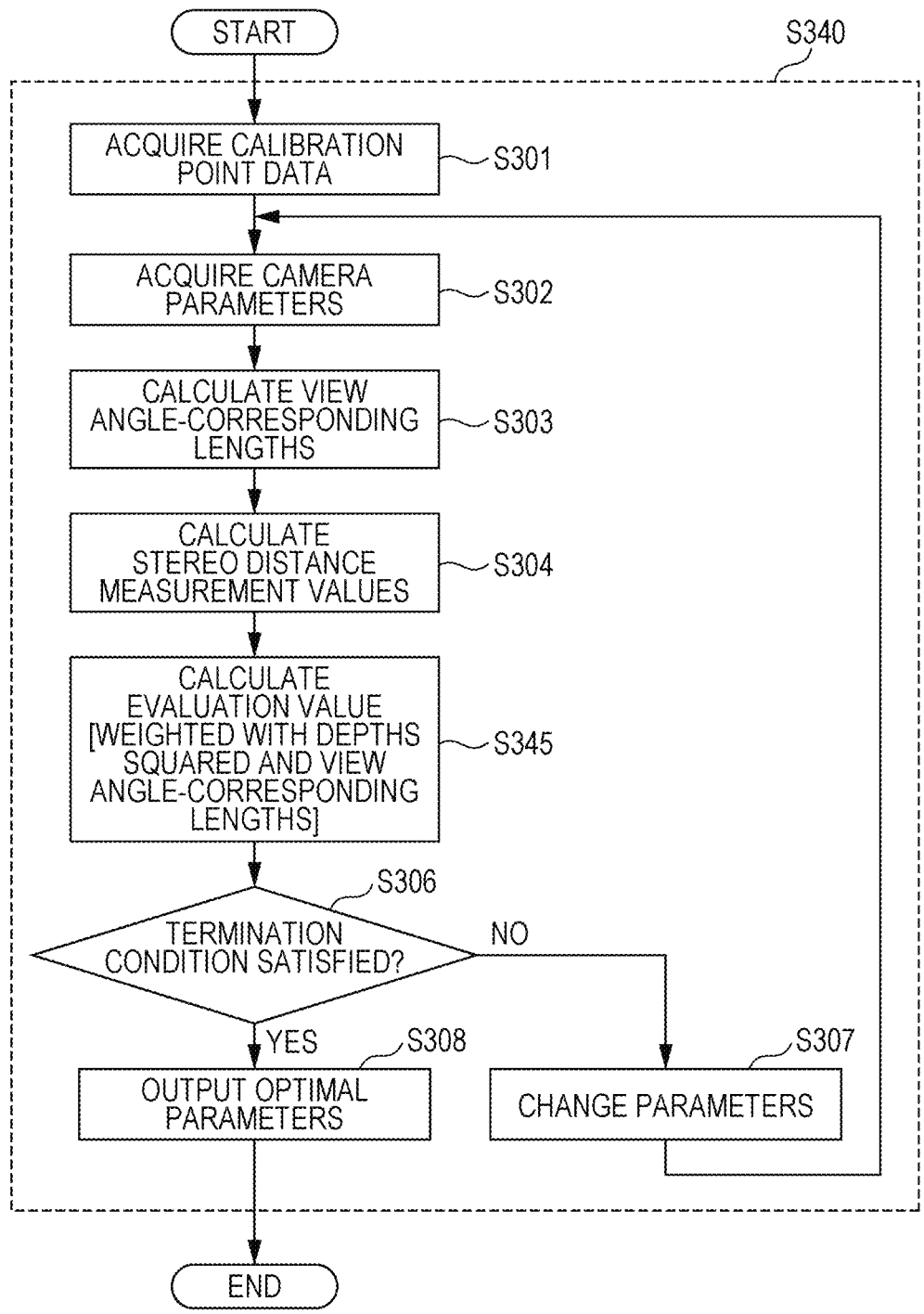
FIG. 14 is a flowchart illustrating an example of operation flow of a camera calibration apparatus according to Embodiment 5.

Reference to FIG. 14 shows a flowchart illustrating an example of the operation flow of the camera calibration apparatus according to Embodiment 5. The camera calibration apparatus according to Embodiment 5 performs a camera parameter calculation process S340. The camera parameter calculation process S340 is the same as in Embodiment 4 except that the processing at step S345 is included instead of step S335.

Then, at step S345, the camera parameter update unit 106 calculates the evaluation value J based on the calibration point data on the calibration points, the view angle-corresponding lengths corresponding to the respective calibration points, and the three-dimensional coordinate sets of the measurement points corresponding to the respective calibration points. Here, the camera parameter update unit 106 uses the weight wk indicated in Equation 9 below as the weight wk applied to the Euclidean distance between each calibration point and its measurement point. The weight wk in Equation 9 is calculated as a value which is the view angle-corresponding length corresponding to each calibration point divided by the square of the depth of that calibration point. Lk in Equation 9 is the same as that in Equation 8. Note that the weights wk may be normalized such that the total sum thereof is 1.

$$w_t = \frac{d_{\mathit{eff},t}}{L_k^2} \qquad \text{(Equation 9)}$$

Compared to Embodiment 4, the above-described weight wk makes it possible to more reduce the risk that the contributions of the distance measurement errors in the measurement points to the evaluation value J mainly originate from relatively large distance measurement errors attributed to calibration points at a distance. Thus, the camera calibration apparatus according to Embodiment 5 makes it possible to obtain an evaluation value J with a further reduced influence of the depths of calibration points compared to Embodiment 4.

[Others]

In the foregoing, the camera calibration apparatuses and the like according to one or more embodiments of the present disclosure have been described. However, the technique of the present disclosure is not limited to these embodiments. The scope of one or more embodiments of the present disclosure may include the present embodiments having various modifications which those skilled in the art can think of and embodiments constructed by combining constituents of different embodiments within a range not departing from the gist of the present disclosure.

For example, the weights w used for the evaluation value J in Embodiments 1 to 5 are not limited to application to these embodiments. An appropriate combination of the various weights w used in Embodiments 1 to 5 may be the weight on the Euclidean distance between the calibration point and the measurement point in the evaluation function of the evaluation value J. Such a weight on the evaluation function can provide synergistic effects of the weights of the embodiments.

In addition, although each of the cameras being the calibration targets in the multiple-lens camera is a wide angle camera in Embodiments 1 to 5, the camera calibration apparatuses according to the embodiments may be applied for calibration of a camera having any angle of field of view. Even in the case of a narrow angle camera, the camera calibration apparatuses according to the embodiments can accurately calibrate the entire angle of field of view of the camera by employing the weighting which uses view angle-corresponding lengths.

Figure 15:
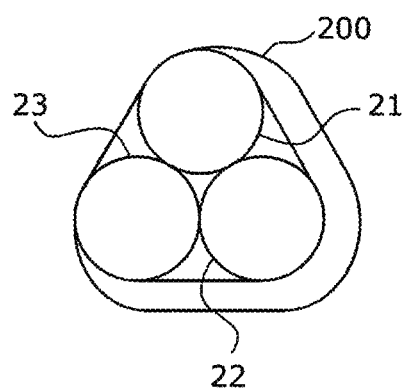
FIG. 15 is a schematic perspective view illustrating a modified example of the multiple-lens camera to which the camera calibration apparatus according to the embodiment is applied.

In addition, while the multiple-lens camera 10 is configured to include two cameras 21 and 22 in Embodiments 1 to 5, the number of cameras is not limited to this. Three or more cameras may be included. For example, the multiple-lens camera may include three cameras 21, 22, and 23 as in the case of a multiple-lens camera 200 illustrated in FIG. 15. The three cameras 21, 22, and 23 may be positioned such that the capture ranges thereof at least overlap one another. For example, as in the example of FIG. 15, the positioning may be such that the optical axes of the cameras 21, 22, and 23 pass through the vertices of an equilateral triangle and are parallel to one another.

The cameras 21, 22, and 23 of such a multiple-lens camera 200 may be calibrated as in the following description. First, a combination of a camera pair including two cameras is selected from the cameras 21, 22, and 23. To be more specific, a first camera pair including the cameras 21 and 22, a second camera pair including the cameras 21 and 23, and a third camera pair including the cameras 22 and 23 are selected. For each of the first camera pair, the second camera pair, and the third camera pair, the camera parameters are calculated in accordance with the camera parameter calculation processes S300, S310, S320, S330, and S340 described in Embodiments 1 to 5.

In the first camera pair, a first camera parameter of each of the cameras 21 and 22 and a first evaluation value corresponding to the first camera parameter are calculated. In the second camera pair, a second camera parameter of each of the cameras 21 and 23 and a second evaluation value corresponding to the second camera parameter are calculated. In the third camera pair, a third camera parameter of each of the cameras 22 and 23 and a third evaluation value corresponding to the third camera parameter are calculated. Thus, two camera parameters are calculated for the cameras 21, 22, and 23. In addition, two camera parameters are unified for each of the cameras 21, 22, and 23.

For the camera 21, the first camera parameter and the second camera parameter of the camera 21 are unified. For the camera 22, the first camera parameter and the third camera parameter of the camera 22 are unified. For the camera 23, the second camera parameter and the third camera parameter of the camera 23 are unified.

The unification may be performed by the average value of two camera parameters. In this case, regarding camera parameter elements such as the focal length f, the average value may be calculated for each element. Alternatively, in the evaluation values related to three camera pairs, a camera parameter corresponding to a smaller evaluation value may be selected. Here, consider the case where first evaluation value<second evaluation value<third evaluation value, for example. Since the first evaluation value is smallest, each of the camera parameters of the cameras 21 and 22 is determined to be the first camera parameter thereof. In addition, regarding the camera 23 irrelevant to the first evaluation value, since the second evaluation value is second smallest, the camera parameter is determined to be the second camera parameter thereof.

In addition, as described above, the technique of the present disclosure may have the form of a system, a device, a method, an integrated circuit, a computer program, or a recording medium such as a computer-readable recording disc, and may be a combination of any of the system, the device, the method, an integrated circuit, the computer program, and the recording medium. The computer-readable recording medium includes a non-volatile recording medium such as a CD-ROM.

For example, the processing units contained in the camera calibration apparatuses according to the embodiments described above typically have the form of a large-scale integration (LSI) being an integrated circuit. Each of these processing units may be a single chip. Alternatively, a single chip may contain some or all of the processing units.

In addition, an integrated circuit may be introduced in the form of not only an LSI but also a dedicated circuit or a general-purpose processor. One may use a field programmable gate array (FPGA) which is programmable after the manufacture of an LSI or a reconfigurable processor which is capable of reconfiguration of the settings and the connection for circuit cells in the LSI.

Note that the constituents in the embodiments described above may have the form of dedicated hardware or may function by execution of software programs suitable for the respective constituents. The constituents may function when a program execution unit such as a central processing unit (CPU) or a processor reads a software program recorded in a recording medium such as a hard disc or a semiconductor memory for execution.

In addition, some or all of the above-described constituents may be an integrated circuit (IC) card or a single module which are attachable and detachable. The IC card or the module is a computer system including a microprocessor, a read only memory (ROM), a RAM, and the like. The IC card or the module may include the above-described LSI or the system LSI. The microprocessor operates in accordance with the computer program and thus the IC card or the module performs its function. The IC card and the module may each have tamper resistance.

The camera calibration method of the present disclosure may involve a microprocessing unit (MPU), a CPU, a processor, a circuit such as an LSI, an IC card, a single module, and the like.

Moreover, the technique of the present disclosure may have the form of a software program, a digital signal created by a software program, or a non-transitory computer-readable recording medium in which a program is recorded. In addition, it goes without saying that the above-described program can be distributed through a transmission medium such as the Internet.

In addition, the numbers representing ordinal numbers, numerical values, amounts, and the like used in the above description are all provided for the purpose of specifically exemplifying the technique of the present disclosure, which means that the present disclosure is not limited to these example numbers. In addition, the connection relationship between the constituents is provided for the purpose of specifically exemplifying the technique of the present disclosure, which means that the connection relationship for achieving the function of the present disclosure is not limited to the above.

In addition, the block diagrams provide an example of dividing the functional blocks. Multiple functional blocks may function as a single functional block, a single functional block may be divided into more than one functional block, or some of the functions may be transferred to a different functional block. Additionally, the functions of functional blocks having similar functions may be processed by a single hardware or a single software in a parallel or a time-dividing manner.

A camera calibration apparatus and the like of the present disclosure are useful for calculating camera parameters of any multiple-lens camera having two or more lenses.

What is claimed is:

1. A camera calibration method which calculates camera parameters of two cameras by use of calibration points, the camera calibration method comprising:
   (a1) acquiring calibration point data which is stored in a first memory and which includes three-dimensional coordinate sets of the calibration points and image coordinate pairs of the calibration points in a camera image of each of the cameras;
   (a2) acquiring camera parameters of each camera which are stored in a second memory;
   (a3) for each calibration point, calculating a first value which corresponds to a value of an angle of view of the two cameras viewing the calibration point based on the calibration point data and the camera parameters;
   (a4) for each calibration point, calculating a three-dimensional position of a measurement point which corresponds to a three-dimensional position of the calibration point by use of parallax of the calibration point between the two cameras based on the image coordinate pair of the calibration point and the camera parameters;
   (a5) for each calibration point, weighting a difference between the three-dimensional coordinate set of the calibration point and the three-dimensional position of the measurement point corresponding to the calibration point by use of the first value calculated using the calibration point;
   (a6) updating the camera parameters based on the weighted difference; and
   (a7) outputting the updated camera parameters,
   wherein at least one of the process (a1) to the process (a7) is executed by a processor, and
   wherein the first value is equal to $2 \times L \times \sin(\alpha/2)$, L being a distance between a central position of a lens of any of the two cameras and the calibration point, and $\alpha$ being the value of the angle of view.

2. The camera calibration method according to claim 1, wherein
   when weighting the difference, the process (a5) normalizes the first value calculated using the calibration point to be used by a total sum of the first values calculated using the respective calibration points.

3. The camera calibration method according to claim 1, wherein the process (a5) uses only the difference related to the calibration point used to calculate the first value, when the first value is larger than a threshold.

4. The camera calibration method according to claim 1, wherein when weighting the difference, the process (a5) divides the first value calculated using the calibration point to be used by a distance between the calibration point and the cameras.

5. The camera calibration method according to claim 1, wherein when weighting the difference, the process (a5) divides the calculated using the calibration point to be used by a square of a distance between the calibration point and the cameras.

6. The camera calibration method according to claim 1, wherein
   the process (a6) calculates an evaluation value using a total sum of the differences for the respective calibration points and updates the camera parameters such that the evaluation value is small.

7. A recording medium which is non-transitory and computer-readable and which includes a control program to cause a device provided with a processor to execute processing, the processing being executed by a computer and comprising:
   (a1) acquiring calibration point data including three-dimensional coordinate sets and image coordinate pairs of calibration points from a first memory, the image coordinate pairs of the calibration points being image coordinate pairs of the calibration points in a camera image of each of two cameras;
   (a2) acquiring camera parameters of each camera from a second memory;
   (a3) for each calibration point, calculating a first value which corresponds to a value of an angle of view of the two cameras viewing the calibration point based on the calibration point data and the camera parameters;
   (a4) for each calibration point, calculating a three-dimensional position of a measurement point which corresponds to a three-dimensional position of the calibration point by use of parallax of the calibration point between the two cameras based on the image coordinate pair of the calibration point and the camera parameters;
   (a5) for each calibration point, weighting a difference between the three-dimensional coordinate set of the calibration point and the three-dimensional position of the measurement point corresponding to the calibration point by use of the first value calculated using the calibration point;
   (a6) updating the camera parameters based on the weighted difference; and
   (a7) outputting the updated camera parameters,
   wherein the first value is equal to $2 \times L \times \sin(\alpha/2)$, L being a distance between a central position of a lens of any of the two cameras and the calibration point, and $\alpha$ being the value of the angle of view.

8. The recording medium according to claim 7, wherein when weighting the difference, the process (a5) normalizes the first value calculated using the calibration point to be used by a total sum of the first values calculated using the respective calibration points.

9. The recording medium according to claim 7, wherein the process (a5) uses only the difference related to the calibration point used to calculate the first value, when the first value is larger than a threshold.

10. The recording medium according to claim 7, wherein when weighting the difference, the process (a5) divides the first value calculated using the calibration point to be used by a distance between the calibration point and the cameras.

11. The recording medium according to claim 7, wherein when weighting the difference, the process (a5) divides the first value calculated using the calibration point to be used by a square of a distance between the calibration point and the cameras.

12. The recording medium according to claim 7, wherein the process (a6) calculates an evaluation value using a total sum of the differences for the respective calibration points and updates the camera parameters such that the evaluation value is small.

13. A camera calibration apparatus which includes a processing circuit to calculate camera parameters of two cameras, the processing circuit performing processing comprising:
- (a1) acquiring calibration point data which includes three-dimensional coordinate sets of calibration points and image coordinate pairs of the calibration points in a camera image of each of the two cameras from a first memory;
- (a2) acquiring camera parameters of each camera from a second memory;
- (a3) for each calibration point, calculating a first value which corresponds to a value of an angle of view of the two cameras viewing the calibration point based on the calibration point data and the camera parameters;
- (a4) for each calibration point, calculating a three-dimensional position of a measurement point which corresponds to a three-dimensional position of the calibration point by use of parallax of the calibration point between the two cameras based on the image coordinate pair of the calibration point and the camera parameters;
- (a5) for each calibration point, weighting a difference between the three-dimensional coordinate set of the calibration point and the three-dimensional position of the measurement point corresponding to the calibration point by use of the first value calculated using the calibration point;
- (a6) updating the camera parameters based on the weighted difference; and
- (a7) outputting the updated camera parameters, wherein the first value is equal to $2 \times L \times \sin(\alpha/2)$, L being a distance between a central position of a lens of any of the two cameras and the calibration point, and $\alpha$ being the value of the angle of view.

14. The camera calibration apparatus according to claim 13, wherein
when weighting the difference, the processing circuit normalizes the first value calculated using the calibration point to be used by a total sum of the first values calculated using the respective calibration points.

15. The camera calibration apparatus according to claim 13, wherein the processing circuit uses only the difference related to the calibration point used to calculate the first value, when the first value is larger than a threshold.

16. The camera calibration apparatus according to claim 13, wherein when weighting the difference, the processing circuit divides the first value calculated using the calibration point to be used by a distance between the calibration point and the cameras.

17. The camera calibration apparatus according to claim 13, wherein when weighting the difference, the processing circuit divides the first value calculated using the calibration point to be used by a square of a distance between the calibration point and the cameras.

18. The camera calibration apparatus according to claim 13, wherein
the processing circuit calculates an evaluation value using a total sum of the differences for the respective calibration points and updates the camera parameters such that the evaluation value is small.

* * * * *